US012287832B2

(12) United States Patent
Martin et al.

(10) Patent No.: US 12,287,832 B2
(45) Date of Patent: *Apr. 29, 2025

(54) CHART-BASED TIME SERIES REGRESSION MODEL USER INTERFACE

(71) Applicant: Palantir Technologies Inc., Denver, CO (US)

(72) Inventors: Christopher Martin, Minneapolis, MN (US); David Fowler, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/316,953

(22) Filed: May 12, 2023

(65) Prior Publication Data

US 2023/0359675 A1 Nov. 9, 2023

Related U.S. Application Data

(63) Continuation of application No. 17/457,400, filed on Dec. 2, 2021, now Pat. No. 11,693,905, which is a
(Continued)

(51) Int. Cl.
*G06F 16/904* (2019.01)
*G06F 16/36* (2019.01)
(Continued)

(52) U.S. Cl.
CPC .......... *G06F 16/904* (2019.01); *G06F 16/367* (2019.01); *G06N 20/10* (2019.01); *G06T 11/206* (2013.01); *G06N 5/022* (2013.01)

(58) Field of Classification Search
CPC ..... G06F 16/904; G06F 16/367; G06N 20/10; G06N 5/022; G06T 11/206
See application file for complete search history.

(56) References Cited

U.S. PATENT DOCUMENTS

| 7,667,582 B1 | 2/2010 | Waldorf |
| 7,844,892 B2 | 11/2010 | Shewchenko et al. |

(Continued)

FOREIGN PATENT DOCUMENTS

| EP | 1126384 | 8/2001 |
| EP | 3343403 | 7/2018 |

OTHER PUBLICATIONS

Anonymous, "Welcome to SensorCloud", Apr. 9, 2017, Retrieved from the Internet: URL: https://web.archive.org/web/20170409125040/https://sensorcloud.com/welcome; [retrieved on Aug. 17, 2018].

*Primary Examiner* — Quoc A Tran
(74) *Attorney, Agent, or Firm* — Knobbe, Martens, Olson & Bear, LLP

(57) ABSTRACT

Methods and systems for providing a user interface and workflow for interacting with time series data, and applying portions of time series data sets for refining regression models. A system can present a user interface for receiving a first user input selecting a first model from a list of models for modeling the apparatus, generate and display a first chart depicting a first time series data set depicting data from a first sensor, generate and display a second chart depicting a second time series data set depicting a target output of the apparatus, receive a second user input of a portion of the first time series data set, and generate and display a third chart depicting a third time series data set depicting an output of the selected model and aligned with the second chart of the target output and updated in real-time in response to the second user input.

14 Claims, 10 Drawing Sheets

Related U.S. Application Data continuation of application No. 16/454,507, filed on Jun. 27, 2019, now Pat. No. 11,222,077.

(60) Provisional application No. 62/822,364, filed on Mar. 22, 2019.

(51) Int. Cl.
*G06N 5/022* (2023.01)
*G06N 20/10* (2019.01)
*G06T 11/20* (2006.01)

(56) References Cited

U.S. PATENT DOCUMENTS

| | | | |
|---|---|---|---|
| 9,043,894 B1* | 5/2015 | Dennison | H04L 63/1408 |
| | | | 726/11 |
| 9,256,846 B2 | 2/2016 | Stluka et al. | |
| 10,140,327 B2* | 11/2018 | Elkherj | G06Q 30/0282 |
| 10,216,695 B1 | 2/2019 | Shankar et al. | |
| 11,222,077 B1 | 1/2022 | Martin et al. | |
| 11,693,905 B2 | 7/2023 | Martin et al. | |
| 2006/0129554 A1 | 6/2006 | Suyama et al. | |
| 2013/0103657 A1 | 4/2013 | Ikawa et al. | |
| 2014/0101139 A1 | 4/2014 | Gemert et al. | |
| 2015/0186338 A1 | 7/2015 | Mirra et al. | |
| 2016/0088013 A1 | 3/2016 | Watson et al. | |
| 2016/0275432 A1 | 9/2016 | Guinness et al. | |
| 2017/0355036 A1 | 12/2017 | Rozmarynowski et al. | |
| 2018/0181629 A1 | 6/2018 | Stowe et al. | |
| 2018/0349365 A1 | 12/2018 | McRaven et al. | |
| 2019/0155809 A1 | 5/2019 | Shankar et al. | |

* cited by examiner

CHART-BASED TIME SERIES REGRESSION MODEL USER INTERFACE

CROSS-REFERENCE TO RELATED APPLICATIONS

This application is a continuation of U.S. patent application Ser. No. 17/457,400, filed Dec. 2, 2021, and titled "CHART-BASED TIME SERIES REGRESSION MODEL USER INTERFACE", which is a continuation of U.S. patent application Ser. No. 16/454,507, filed Jun. 27, 2019, and titled "CHART-BASED TIME SERIES REGRESSION MODEL USER INTERFACE", which claims the benefit of U.S. Provisional Patent Application No. 62/822,364, filed Mar. 22, 2019 and titled "CHART-BASED TIME SERIES REGRESSION MODEL USER INTERFACE." The entire disclosure of each of the above items is hereby made part of this specification as if set forth fully herein and incorporated by reference for all purposes, for all that it contains. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data interaction, visualization, and model generation. More specifically, this disclosure relates to providing visualization of an ontology-based time series data set and generating a model using the time series data set.

BACKGROUND

Systems monitoring events, processes or operations of a system can collect data in a time series data set which includes numerous data samples (e.g., from multiple sensors) and corresponding time indications of when each data sample was collected. In different contexts, a time series data set includes a collection of the time series data from one or more data collectors that can correspond to a grouping of a series of events that may occur, for example, in a system, plant, or factory. Quickly producing a model for a system or process associated with the time series data set can be difficult due to the iterative nature of modeling and lack of insight into the data being used during modeling.

A modeling process can require selecting a model, and selecting time series data sets as input features for training the model. Training a particular model can be difficult and unintuitive, requiring selecting what portions of input data to use to train the model without knowledge of the time series data used as the input data. Also, in some modeling processes, time-consuming code changes may need to be made to a model when iterative changes are made during modeling. For example, when different features are used as an input, or when a different model is selected as a starting point. In addition, input data for the model may include "noise" which can affect its use in training a model. While conventional and methodical modeling approaches may be good practice for making changes to an existing model in production, such techniques may not be nimble enough when the model inputs (features, training periods, models, etc.) are changing rapidly, for example, in earlier stages of modeling when you are determining which features to use as input to the model and what type of model is best to use to model the process at hand. Accordingly, it would be useful for a system to facilitate rapid selection and visualization of features used as model inputs, and to generate and display in real-time data corresponding to the model output.

SUMMARY

Embodiments of systems and methods of a time series interaction and analysis user interface for generating a model are disclosed herein. In various embodiments of a modeling system and workflow, a user interface is configured to receive user input to display and define features that may be used as input to a model. The user interface includes functionality for selecting a type of model, selecting and displaying one or more features as an input to the selected model, and selecting and displaying a feature as a "target" (e.g., data the model is trying to mimic). The features are associated by an ontology such that a set of features are associated with a certain system or process. Time series data associated with the features used as input to a model is associated with a certain batch. After training a model with time series data from one batch, corresponding features from another batch (e.g., from the same equipment) can easily be selected and used to further train the model, as facilitated by the ontology.

The user interface can receive user inputs to modify or "clean" time series data associated with a feature before it is used as an input to the model, or used as a target. For example, the time series data may be processed to remove outliers, and/or smoothed by an averaging technique (e.g., rolling average). The user interface allows a user to select a model from a list of displayed models in the user interface, and select a feature associated with the system or process being modeled as the target. To train a model, the user can iteratively select from the user interface one or time periods (time intervals) of displayed time series as input to the model. The user interface can apply the selected portions to the model and, in real-time, displays a model output aligned with the time series inputs, and also aligned with the target. All input features (time series), the target, and time intervals selected to train the model, can be interacted with simultaneously, and the model output are displayed in plots aligned in the user interface and updated in real-time.

In one innovation, a system includes one or more non-transitory computer storage mediums configured to store at least a plurality of features each associated with a sensor of an apparatus, each feature comprising time series data relating to a first batch associated with the apparatus, one or more models, and computer-executable instructions. The system can include one or more computer hardware processors in communication with the one or more non-transitory computer storage mediums, the one or more computer hardware processors configured to execute the computer-executable instructions to at least cause presentation of a user interface configured to receive a user input selecting a first model from a list of the one or more models for modeling the apparatus, cause presentation of a user interface configured to receive user input selecting one or more features as an input to the first model, cause presentation of a user interface configured to receive user input to define, for each selected feature, parameters defining one or more plots of time series data of a sensor of the apparatus associated with the selected feature, and generate and display, in the user interface, a model input chart for each selected feature, each chart depicting the one or more plots of the associated feature, and the one or more plots being temporally aligned in the chart. The one or more computer hardware processors can be configured to execute the computer-executable instructions to cause presentation of a user interface configured to receive user input selecting one plot from each of one or more of the model input charts to use as an input to the first model, cause presentation of a user interface configured to receive user input selecting at least one time interval defining a time period to train the model with the selected plots, cause presentation of a user interface configured to receive a user input selecting a target feature for the model to mimic, the target feature comprising time series data associated with a sensor of the apparatus, generate and display, in the user interface, a model output chart depicting a first plot of time series data of the sensor associated with the target feature, and generate and display, in the user interface and on the model output chart, a second plot depicting time series data representing an output of the selected model based on the selected plots and the time intervals from the model input charts, the first and second plot of the model output chart temporally aligned and updated in real-time in response to changes of the selected plots from the model input charts.

Such systems may include other one or more other aspects in various embodiments. The computer storage mediums can be further configured to store an ontology defining relationships among features of two or more batches associated with the apparatus. The one or more computer hardware processors can be further configured to execute the computer-executable instructions to determine, via the ontology, a relationship of the features selected as an input to the first model associated with the first batch and corresponding features associated with a second batch associated with the apparatus, and refine the first model using one or more features associated with the second batch. To refine the first model using one or more features associated with the second batch, the one or more computer hardware processors can be configured to execute the computer-executable instructions to, for the one or more features associated with the second batch, cause presentation of a user interface configured to define, for each selected feature, parameters defining one or more plots of time series data of a sensor of the apparatus associated with the selected feature, generate and display, in the user interface, a model input chart for each selected feature, each chart depicting the one or more plots of the associated feature, and the one or more plots being temporally aligned in the chart, cause presentation of a user interface configured to receive user input selecting one plot from each of one or more of the model input charts to use as an input to the first model, cause presentation of a user interface configured to receive user input selecting at least one time interval plot defining a time period to train the model with the selected plots, cause presentation of a user interface configured to receive a user input selecting a target feature for the model to mimic, the target feature comprising time series data associated with a sensor of the apparatus, generate and display, in the user interface, a model output chart depicting a plot of time series data of the sensor associated with the target feature, and generate and display, in the user interface and on the model output chart, a second updated plot depicting time series data representing an output of the selected model based on the selected plots of the one or more features associated with the second batch and the timing interval from the model input charts. In some embodiments, the one or more computer hardware processors are further configured to execute the computer-executable instructions to cause presentation of a user interface configured to receive a user input selecting a second model from a list of the one or more models for modeling the apparatus, and generate and display, in the user interface, an updated model output chart further depicting a third plot of time series data set representing an output of the selected second model based on the selected plots and the timing interval from the model input charts, the third plot temporally aligned with the first and second plot of the model output chart and updated in real-time in response to changes of the selected plots from the model input charts.

In some embodiments, for each selected feature, the one or more computer hardware processors are further configured to execute computer-executable instructions to modify the time series data used to generate each plot using the parameters defining each plot. In some embodiments, the parameters modify the time series data by smoothing the time series data. In some embodiments, the parameters modify the time series data by averaging the time series data. In some embodiments, the parameters modify the time series data by downsampling the time series data. In some embodiments, the parameters modify the time series data by removing outliers in the time series data. In some embodiments, the one or more models include at least one of a linear model, an elastic-net model or a support vector machine model. In some embodiments, the one or more computer hardware processors are further configured to execute the computer-executable instructions to cause presentation of a user interface configured to receive user input to define a weight value for each selected feature, the weight value indicating how much said each feature affects the output of the model.

Another innovation includes a method for generating a model. The method can be performed by one or more computer hardware processors configured to execute computer-executable instructions on a non-transitory computer storage medium. In an embodiment, method can include causing presentation of a user interface configured to receive a user input selecting a first model from a list of the one or more models for modeling the apparatus, causing presentation of a user interface configured to receive user input selecting one or more features as an input to the first model, causing presentation of a user interface configured to receive user input to define, for each selected feature, parameters defining one or more plots of time series data of a sensor of the apparatus associated with the selected feature, generating and displaying, in the user interface, a model input chart for each selected feature, each chart depicting the one or more plots of the associated feature, and the one or more plots being temporally aligned in the chart, causing presentation of a user interface configured to receive user input selecting one plot from each of one or more of the model input charts to use as an input to the first model, causing presentation of a user interface configured to receive user input selecting at least one time interval plot defining a time period to train the model with the selected plots, causing presentation of a user interface configured to receive a user input selecting a target feature for the model to mimic, the target feature comprising time series data associated with a sensor of the apparatus, generating and displaying, in the user interface, a model output chart depicting a first plot of time series data of the sensor associated with the target feature, and generating and displaying, in the user interface and on the model output chart, a second plot depicting time series data representing an output of the selected model based on the selected plots and the timing interval from the model input charts, the first and second plot of the model output chart temporally aligned and updated in real-time in response to changes of the selected plots from the model input charts.

Such methods may include other one or more other aspects in various embodiments. In some embodiments, the method further includes storing an ontology defining relationships among features of two or more batches associated with the apparatus, determining via the ontology, a relationship of the features selected as an input to the first model associated with the first batch and corresponding features associated with a second batch associated with the apparatus, and refining the first model using one or more features associated with the second batch. In some embodiments, refining the first model using one or more features associated with the second batch, includes causing presentation of a user interface configured to define, for each selected feature associated with the second batch, parameters defining one or more plots of time series data of a sensor of the apparatus, generating and displaying, in the user interface, a model input chart for each selected feature associated with the second batch, each chart depicting the one or more plots of the associated feature, and the one or more plots being temporally aligned in the chart, causing presentation of a user interface configured to receive user input selecting one plot from each of one or more of the model input charts to use as an input to the first model, causing presentation of a user interface configured to receive user input selecting at least one time interval plot defining a time period to train the model with the selected plots, causing presentation of a user interface configured to receive a user input selecting a second target feature associated with the second batch, for the model to mimic, the second target feature including time series data associated with a sensor of the apparatus, generate and display, in the user interface, a model output chart depicting a plot of time series data of the sensor associated with the second target feature, and generating and displaying, in the user interface and on the model output chart, a second updated plot depicting time series data representing an output of the selected model based on the selected plots of the one or more features associated with the second batch and the timing interval.

In some embodiments, the method includes causing presentation of a user interface configured to receive a user input selecting a second model from a list of the one or more models for modeling the apparatus, and generating and displaying, in the user interface, an updated model output chart further depicting a third plot of time series data set representing an output of the selected second model based on the selected plots and the timing interval from the model input charts, the third plot temporally aligned with the first and second plot of the model output chart and updated in real-time in response to changes of the selected plots from the model input charts. In some embodiments, the method includes modifying the time series data used to generate each plot using the parameters defining each plot. In some embodiments, the parameters modify the time series data by at least one of smoothing the time series data, averaging the time series data, downsampling the time series data, or removing outliers in the time series data. In some embodiments, the method includes causing presentation of a user interface configured to receive user input to define a weight value for each selected feature, the weight value indicating how much said each feature affects the output of the model.

Another innovation includes a method for generating a model. The method can include storing an ontology defining relationships among features associated with system, each of the features also associated with time series data of two or more batches, causing presentation of a user interface configured to receive a user input selecting a model from a list of the one or more models for modeling the system, causing presentation of a user interface configured to receive user input selecting one or more features as an input to the first model, each of the one or more features being associated with a sensor, causing presentation of a user interface configured to receive user input for each selected feature parameters defining one or more plots of time series data of a sensor of the apparatus associated with the selected feature, generating and displaying, in the user interface, a model input chart for each selected feature, each chart depicting the one or more plots of the associated feature temporally aligned in the chart, causing presentation of a user interface configured to receive user input selecting a plot from one or more of the model input charts, causing presentation of a user interface configured to receive user input selecting time intervals indicating time periods for providing data from the selected plots to the model, causing presentation of a user interface configured to receive a user input selecting a target feature comprising time series data associated with a sensor of the system, generating and displaying, in the user interface, a model output chart depicting a first plot of time series data of the sensor associated with the target feature, and generating and displaying, in the user interface and on the model output chart, a second plot depicting time series data representing an output of the selected model based on the selected plots from the model input charts and the time intervals, the first and second plot of the model output chart temporally aligned and updated in real-time in response to changes of the selected plots. In some embodiments of a method, during a first timing interval the selected plots are associated with a first batch and during a second timing interval the selected plots are associated with a second batch.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; changing input for modeling, and changing a selected model, is slow and cumbersome, etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
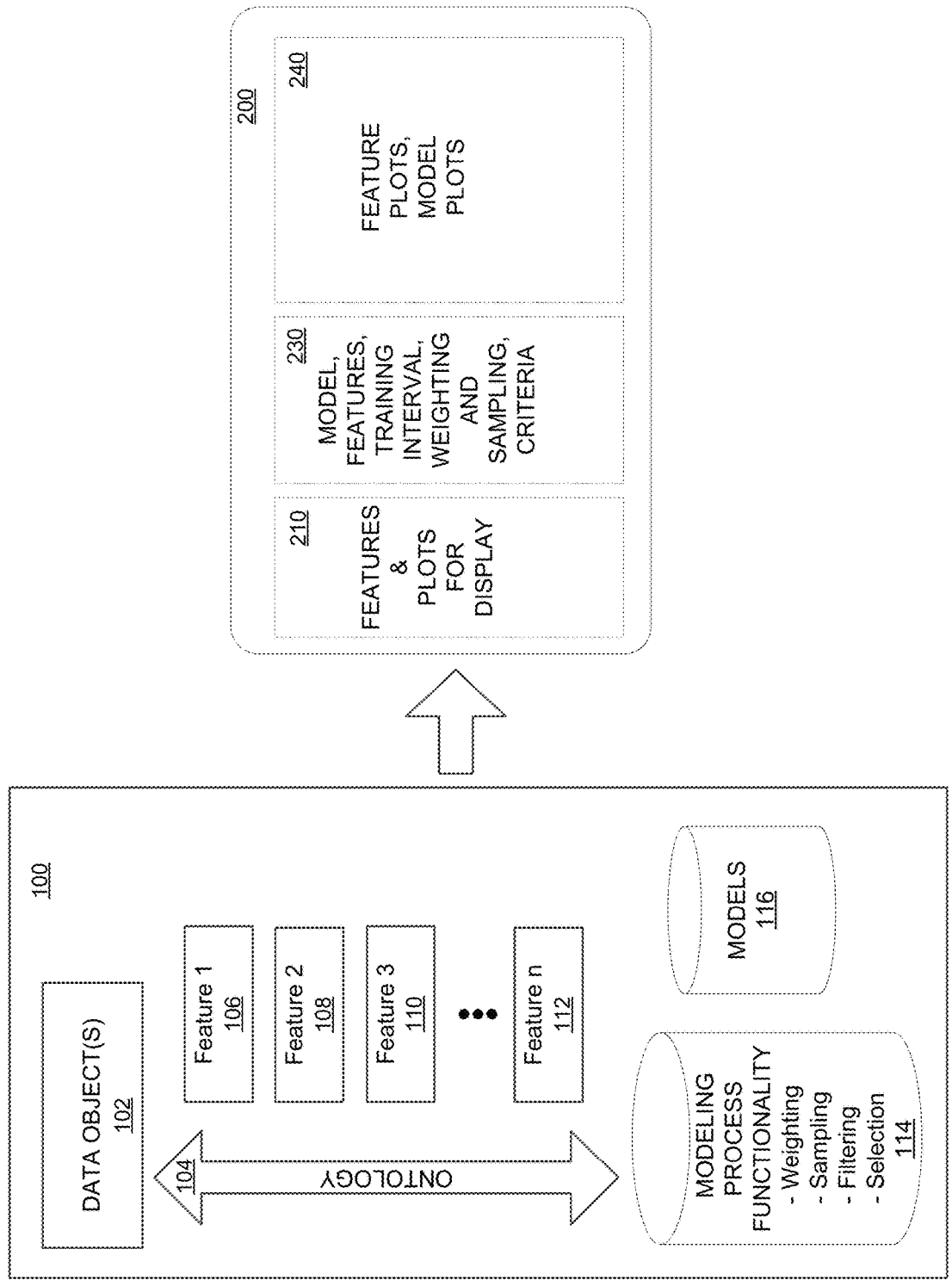
FIG. 1 is a schematic illustrating an example of functionality that may be incorporated in a system or method for plot-based modeling that uses multiple features as an input to the model, each feature being a time series data sets associated with a data object, and using an ontology defining relationships among the data types to pivot the plot-based modeling to include other feature associated with other data objects to rapidly determine and train a model.

Embodiments of systems and methods of a time-series interaction and analysis user interface for generating a system model are disclosed herein. A software application provides a user interface and workflow for interacting with and visualizing time series data sets, including chart templating functionality enabled by an ontology that defines relationships among data types. For example, various features associated with a system and a batch can be used as inputs to a model. In some instances, a model refined with features from one batch can be refined with corresponding features (or other features) from a different batch. In instances where similar systems have similar features, a model trained with features from one system can be further trained (or refined) with corresponding features from another system, and a resulting model can be applicable to both systems.

In various operational work-flows, a software application provides a user interface and workflow for interacting with and visualizing time series data sets, and applying selected portions of time series data sets for refining machine learning models, for example, regression models, classification models, segmentation/clustering models, forecasting models, and the like. The user interface can include functionality for selecting and displaying features that include time series data from identified sensors as inputs to a selected model. The user interface gives instant feedback from manipulations to the features and to the model. When features being manipulated are inputs to a model, or when the model parameters themselves are being changed, this tactile response seen by a user on the user interface provides visualization for how the model is behaving, even without detailed knowledge of the internal processing being performed.

A modeling system can process the time series data to clean the data before it is used as an input to the model. For example, the time series data can be "smoothed" by an averaging technique (e.g., rolling average), have outliers removed, and/or be downsampled. Feature representations of raw time series data also can be displayed (e.g., raw series data of a particular sensor of a system). A user can select a model from a list of displayed models in the user interface, and can also select a feature in the user interface as the model output target (that is, the output time series data that the model is trying to mimic). To train the model, the user can iteratively select from the user interface one or more portions (time intervals) of displayed time series as input to the model. The user interface can apply the selected portions to the model and, in real-time, displays a model output aligned with the time series inputs, and also aligned with the target output. The selected model, all input features, the target, time intervals selected to train the model, and associated parameters can be interacted with in any order in the user interface. Charts displaying plots of the input features, the target and the model's output are displayed simultaneously and temporally in the user interface, and updated in real-time with any changes to the modeling inputs or parameters.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time. A batch generally is associated with a start time and an end time, and may be monitored over a time period to collect data, the data being associated with a time during the batch (e.g., collected at an instance of time, or collected during a period of time during the batch). Time series data is an example of data that may be associated with a batch. In one example, a batch may refer to a process where a material or substance is subject to one or more events (or processes) that cause one or more changes to the material or substance, for example, a grouping of related events processes or operations may comprise a batch. In another example, a batch may refer to the occurrence of a certain thing, a certain event, or portion of an event, that occurs numerous times. For example, the event of a train traveling from Chicago to Milwaukee may be referred to as a batch, and information that occurs on the train relating to the train itself (e.g., mechanical information), or to anything that happens on the train (e.g., passengers getting on and off, money spent in the restaurant car, communications made via the trains Wi-Fi network, etc.) can be part of the data collected for the batch.

In another example, the instances when a submarine submerges between 33 feet and 330 feet may be referred to as a batch, and during such a batch numerous data may be collected regarding the equipment operating on the submarine, or information relating to integrity of the hull maybe collected. In another example, a batch may refer to a circumstance or situation when a system, or a portion of a system, operates and is monitored over a period of time. In another example, a car driving from point A to Point B, or for a certain duration of time, can be referred to as a batch. Similarly, a system operating (e.g., to heat water, refine oil, make food products, travel from point A to point B, etc.) may be referred to as a batch. In another example, the processing of a material (any substance, e.g., water, beer, concrete, oil, produce, paint, etc.) being operated on by a system may also be referred to as a batch. One or more sensors or processes can be used to collect data associated with a batch, and/or one or more users can monitor a batch and provide input to a batch.

A portion of an event or process may also be referred to as a batch if information is collected during the event or process. For example, a batch may refer to a baseball pitch/hit event, where a movement of a baseball (e.g., position, velocity, trajectory, rotation, etc.) is monitored as it travels from the pitcher's hand to the batter, and then from the batter's bat to the outfield. A batch may also refer to a portion of the baseball pitch/hit event, for example, only the portion from where a bat hits the baseball and the baseball travels to the outfield. In some cases, batch data may be collected for a baseball pitch/hit event and then later it is decided to look at a portion of the collected data as a separate batch, for example, only the portion of the movement of the baseball after the baseball is hit by the bat. In such cases, the pitch/hit batch can be analyzed by storing as separate metadata the exact start and end times of each time during a game a baseball leaves the pitcher's hand, gets hit by the bat and travels to the outfield during a pitch/hit event. Subsequently, a search can be done on the pitch/hit event batch data to identify a set of start/stop times when the baseball is hit by the bat and has traveled 100 feet from the batter, and those can be considered to be a set of batches and analyzed.

In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of a substance that is associated with the batch and performing quality analysis of the substance. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time series data collected by each sensor, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time Series Data: A series of information referenced to time. For example, a series of information that is sensed, collected, determined, and/or stored over a period of time, such that the information may be referenced by the time that it was sensed, collected, determined, and/or stored. As used herein in reference to time series data, "information" is a broad term that may include sensor information and/or other types information that is collected either in reference to an instance of time or during a defined time period (e.g., milliseconds, seconds, minutes, hours, days, weeks, months, years, etc.). Time series data can include the number of times an event occurs during a time period. Some examples of time series data are provided here, but these examples are not meant to limit the type of information that can be included in time series data. In some examples, time series of information may be generated by a sensor monitoring a characteristic, for example, temperature, pressure, pH, light or radiation, dissolved oxygen, carbon dioxide, gas composition, size, vibration, or movement. In some examples, time series data may be a count of a certain occurrence over a designated period of time, e.g., the number of people that pass through a turnstile every minute during a week; the number of cars that travel past a certain location in a city every five minutes for a year; the count of telephone calls a call center during consecutive 15 minute periods for a year; and the amount of money all the cash registers of a store collect during 30 minute time periods for a year; or the number of times a certain computer operation occurs (e.g., an error log or message is generated, a query is made, a certain communication is made) in a certain time period. In some examples, the series of information is determined by using data from one sensor and other information, for example, data from another sensor or stored data. In another example the series information is determined by a user's input, for example, where the user input is a quality characterization. Time series data, or a time series data set, may also be referred to herein simply as a "time series."

Feature: Information used in a modeling process. For example, information used for generating or revising a model. A feature as used herein can refer to information that is used as an input to a modelling process. A feature can include time series data. A feature can be associated with an object and an object type (e.g., Sensor Type). For example, when a feature is an input to a model, the feature can include time series data associated with a sensor in a system. A feature can also refer to the output of a modeling process. For example, information generated as a result of a modeling process using a selected model and using other features as input to the modeling process. A feature can also refer to a target of a modeling process. A feature could also be a time series derived from an event, or set of events. For example, a time series that has the value one when a particular event is happening and zero otherwise. A feature can also be a time-bound event. In one example, a model can be trained to determine if an event will occur during a certain period of time. Information relating to something that may cause the event to occur in that time period can be referred to as feature. Technically it may be thought of as a categorical variable that can be represented as a time series, but because an ontology can have events data that can be converted into a time series then used in a model it can be a valuable differentiation.

Target: Information that a model is trying to mimic. A target can include time series data. The target can be displayed with the model output such that they are aligned and/or superimposed for ease of comparison. In an example, a feature that includes time series data associated with a sensor that generates information of a result (e.g., a sensed system output) can be displayed as a target during a modeling process.

Ontology-Based Time Series Model Visualization and Generation

Figure 7:
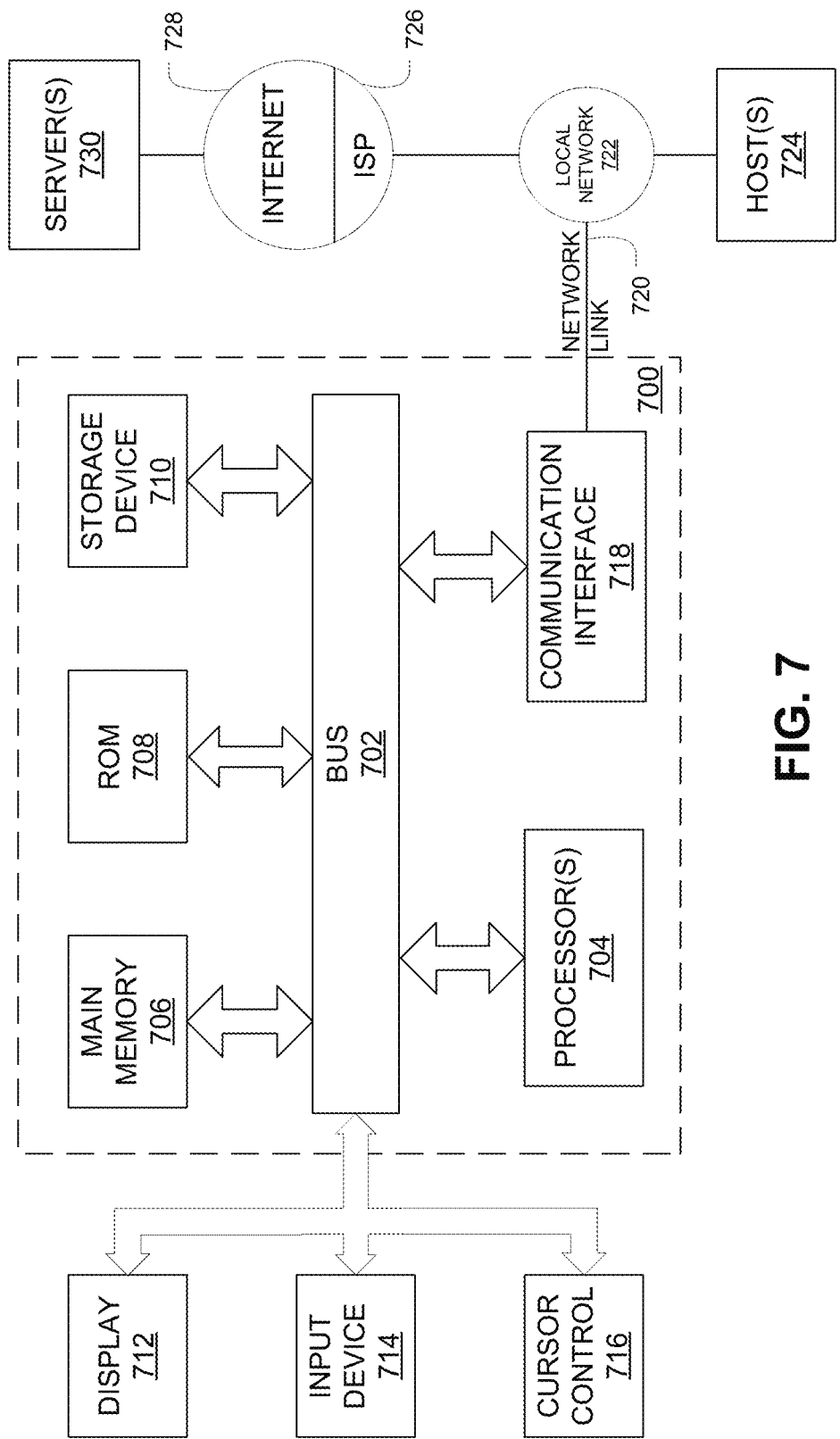
FIG. 7 is an example of an embodiment of a computer system that can implement the embodiments described herein.

FIG. 1 is a schematic illustrating an example of information 100 that can be provided for a modeling process. The information 100 can be provided from electronic storage, for example, from a storage device 710 on a local system, or a storage device associated with a server 730 (FIG. 7). The information 100 can include features associated with time series data. The time series data can be used as input information to generate a model output. The time series data can also be used as a target to compare with the model output to help determine how well the model is performing. The information 100 also includes modeling process functionality for a process or system to perform plot-based modeling.

FIG. 1 also illustrates an example of a user interface 200 of a modeling system. Aspects of the information 100 can be displayed on the user interface 200. The user interface 200 includes a plurality of panels (e.g., panels 210, 230, 250) for displaying information relating to the modeling process and for receiving user inputs. The panels 210, 230, 250 can display information relating to a model, a target, and features and plots of time series data used as input for the model. In an example, panel 210 can display a list of features and associated plots that can be used as input, a target and a model for a modeling process. The description of each plot can include an indication of how the plot is defined (e.g., the smoothing or sampling parameters used for the plot). In an example, panel 230 can display parameters for the modeling process, and receive user input to select a model and information affecting the modeling process, for example, a model, plot parameters, and training intervals. Some non-limiting examples of some models are discussed further below. In an example, panel 250 can display charts associated with each feature, each chart graphically depicting one or more plots associated with the feature. Examples of panels 210, 230, 250 are further described in reference to FIG. 2. As a person of ordinary skill in the art will appreciate, various embodiments can include many different panels and differently arranged panels other than those in the examples disclosed herein.

Still referring to FIG. 1, the information 100 includes a plurality of features 106, 108, 110, 112, each feature defined by an ontology to be associated with previously collected and stored time series data. The ontology can also define associations between the features 106, 108, 110, 112 and a system or event. The ontology can also define associations between the features 106, 108, 110, 112 and a batch. The ontology can also define associations between similar systems, and between a system and one or more batches. For example, the features 106, 108, 110 112 can be associated with a system (or event), and the time series data associated with the features 106, 108, 110 112 is based on sensor data collected in a batch when operating the system (or during the event). In this way, the information 100 can allow a model to be trained with features associated with one system and one batch, and further trained with corresponding features associated with another batch and/or another system.

Features 106, 108, 110, 112 associated with a system or event of interest can be displayed to a user on a user interface 200. The user interface 200 can receive input to select one or more of the features 106, 108, 110, 112 to be used as input for a selected model. That is, the time series data of the selected features is input into the selected model. Selected features can be displayed in plots to visually provide information to a viewer to better understand the information. Some or all of the plots can be temporally aligned and/or superimposed to visually show correlation between the features, and to make selecting time intervals for training a model easier.

Many systems and events have one or more actual outputs, of either the entire system/event or a portion of the system/event, that is sensed and saved (e.g., as time series data). This output indicates some result of the system/event. In a modeling process, this output can be designated as a "target" (or "target output") for a model to mimic. For example, certain portions of a particular output of a system may have a relatively high accuracy during "normal" operation of the system, but has a higher probability of inaccuracy during a system startup period, a system shutdown period, or when unusual system operations occur. Although a statistical model of the system may ultimately be generated to take into account all periods of operation of a system, to produce an accurate model it can be useful to first generate a model of "normal" operations that mimics a target output generated during such normal operations of the system, and then to refine the model for time periods of abnormal operations, where the target may be inaccurate. Any of the features 106, 108, 110, 112 can be used as a target for a model generation process. The target output (e.g., time series data) can be displayed with the output of the generated model (e.g., time series data generated by the model) such that the target output and the model output are temporally aligned and/or superimposed for ease of a visual comparison by a user. In some embodiments, the visual comparison of the target output and the output of the model can be provided in tables that are displayed on a user interface.

During a model generation process, the features 106, 108, 110, 112 may be graphically displayed in plots to visualize the relationships between the features and help a user to understand the information being used to generate a model. Each feature may be displayed in one or more plots. That is, each of the one or more plots generated and displayed for a feature may represent the same feature information (e.g., time series data) but as modified using different parameters. For example, plots for a feature can represent time series data that has been modified to by different averaging (or filtering) processes (e.g., a rolling average of a number of data points, averaging based on a determined standard deviation, outlier removal, etc.), sampling type, and/or sampling count. As a result, a set of plots may be generated for each feature and displayed to a user, e.g., on user interface 200, where each of the plots is generated based on the same time series data of the feature and then modified in different ways to remove noise, smooth, or downsample the time series data to make it more suitable as an input to a model. The user interface 200 allows the plots to be generated iteratively based on input received from a user. In an example, a plot can be generated using a first type of averaging and displayed on the user interface 200. Then, if the user determines that the plot needs further modification (e.g., to remove noise), additional input from a user can be received and the plot is re-generated and displayed. In other example, a plot can be generated and displayed, and if the user determines to modify the plot, additional input can be received from a user and a new plot is displayed, in addition to the first plot. The two plots of the same feature can be displayed in the same chart for easy comparison. In another example, if further modification of the plot is desired, an additional input can be received from a user and a (new) third plot is displayed, in addition to the first plot and second plot. This process can be iteratively repeated to display multiple plots of a feature on the same chart. This process can be repeated for each feature, as desired.

In this example, multiple features are used as an input to a modeling process, each feature associated with a data type and a data object 102 (e.g., a sensor). In an example, each feature 106, 108, 110, 112 is associated with a different sensor in a system having multiple sensors. The system may be operated a number of times to create multiple batches, each batch generating a set of corresponding features. Each of the features is defined using an ontology 104 which allows pivoting the plot-based modeling to include corresponding features from another batch (e.g., as an input or as a reference) and rapidly determine and train a model. In an example, using the ontology, once a model is generated with features associated a first batch, corresponding features from a second batch can be used to determine how well the model works for the second batch, and the model can be refined using the features associated with the second batch. In an example, once a model is generated with features from a first batch, a target from a second batch can be used, along the features of the second batch, to further refine the model. This process can then be repeated for one or more additional batches, each time refining the model. The modeling system can provide a user interface and workflow for interacting with the features 106, 108, 110, 112, visualizing these features, and using these features as input to a selected model, and/or as a target for a generated model, as described in FIGS. 2-7.

The information 100 can include modeling process functionality 114 to display one or more features in a plot in a user interface 200, and to use selected features as input for a model. Before a feature is used (e.g., for display or for input to a model), certain modeling process functionality 114 can "clean" the feature, for example, smooth or average the feature, remove outliers of the feature, etc., for example, as discussed above and further in reference to FIG. 2. In an example, a feature can include a large number of samples for a particular time interval. Each feature can include the same or a different number of samples over the same time period. For performance reasons (that is, to operate on less dense input data), and/or to address these data differences in various features, the modeling process functionality 114 can include sampling functionality to sample the features at a similar time interval such that displayed features, features that are used as input to a model, or as a reference, have the same, or substantially the same, number of data samples within a common time period.

The information 100 also can include one or more models. For example, any model that is available hosted on a compliant API. The following are non-limiting examples of models that can be used: linear, elastic net, support vector machine, random forest, neural network, and models associated with predictive model markup language. The linear model can be a linear combination of the feature inputs. As an option, a linear model can include a fit intercept which determines whether to add a constant term to the feature. The elastic net model is a regularized regression method, similar to the linear model but adds penalties on the size of the coefficients, linearly combining L1 and L2 penalties of lasso and ridge methods. As options, embodiments of elastic net models can include one or more of the following: a fit intercept which determines whether to add a constant term to the feature, an alpha selection that determines the strength of the penalty, and an L1 ratio being the relative strength of the L1 (absolute sum of coefficients) and L2 (sum of coefficients**2) penalties. The support vector machine (SVM) is a supervised learning models with associated learning algorithms that analyze data used for classification and regression analysis. The SVM tries to find a best fit "tube" for the target series. Examples within the tube are "good enough" that is, they don't contribute to the loss. The SVM can efficiently perform a non-linear classification using a radial basis function kernel. Options of an SVM can include: (a) number of estimators (number of trees in the forest), (b) maximum features the number of features to consider when making a split (must be <=the number of features), and (c) maximum depth (maximum depth of a tree). The neural network model can be written in any suitable programming language. Further, the neural network model may optionally make use of internal and/or external code or computing resources or libraries, e.g., via direct implementation or API access. Options of a neural network model can include using a j son text (JSON) text representation of the neural network. The predictive model markup language is a specification for describing models in a transportable xml format so they can be evaluated anywhere. For all models types the number of parameters available to the user may vary from those used in the actual implementation of the model. It is a tradeoff between completeness and ease of use. In some embodiments, a model inherits permissions of the input datasets they were trained on. For example, the data sources used to create the model can be tracked, and the model can be generated to inherit one or more permissions of one or more of the data sources that were used to create the model. In one example, the permissions inherited by the model are based on the least permissive data source used to generate the model. In another example, the permission inherited by the model are the permissions of the most permissive data source.

Figure 2:
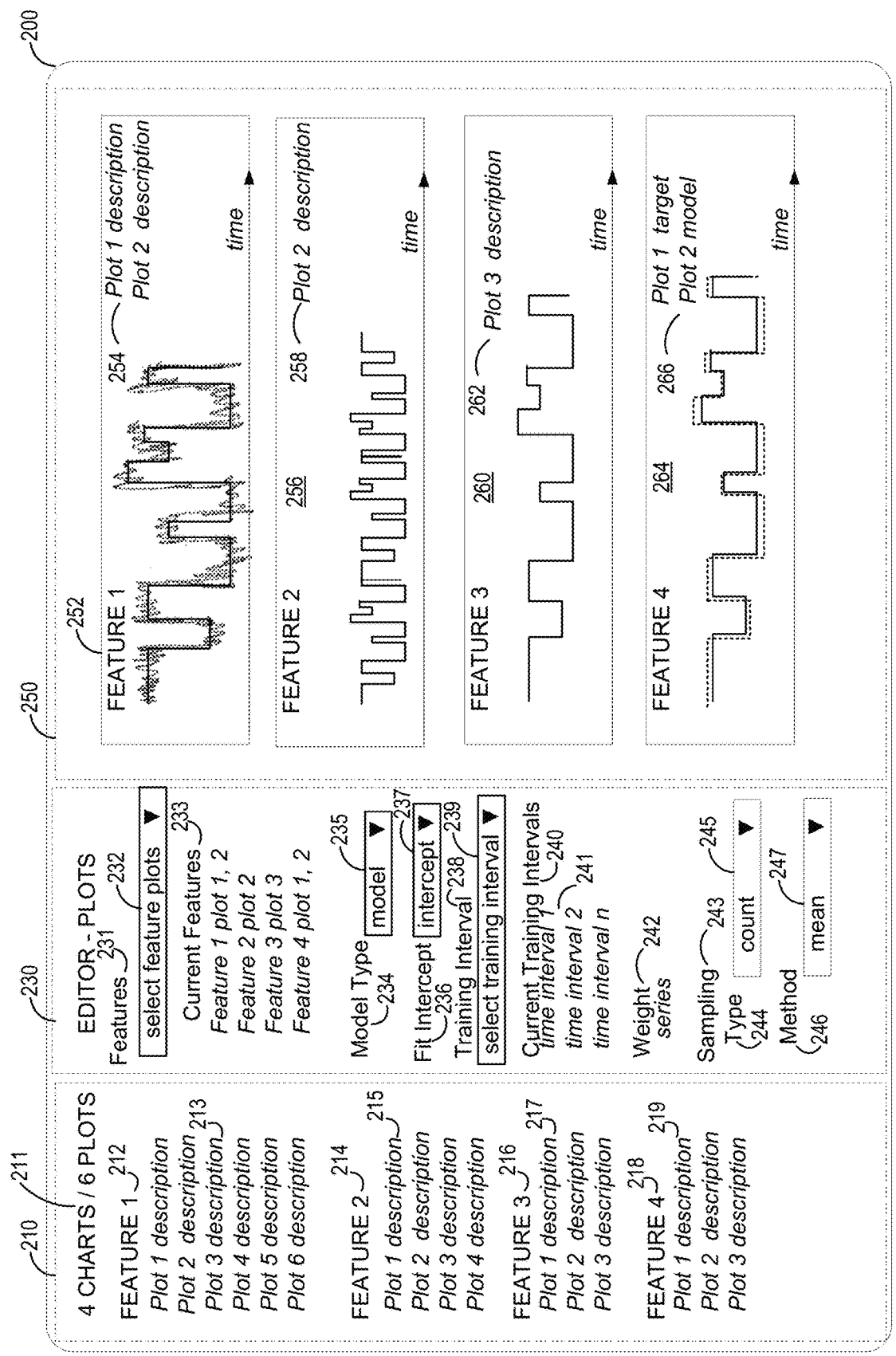
FIG. 2 illustrates an example of a user interface of a system that includes functionality to select a model, select characterize and display input features for generating the model, select a target, and generate and display the resulting model output in an aligned arrangement with the input features and target, where changes made to the features (e.g., smoothing, weighting), model, and training criteria immediately update the model output which is displayed in the user interface for visual analysis.

FIG. 2 illustrates an example of a user interface 200 that includes functionality to select, characterize and display input features for generating a model, select a model, select a target, and generate and display a resulting model output in an aligned arrangement with the input features. Changes made to the features (e.g., smoothing, weighting), the model, and training criteria are immediately included in the modeling process and displayed in a model (output) plot. This example shows three panels 210, 230, 250 of the user interface 200, each panel 210, 230, 250 configured to display certain information and receive user input to invoke various functionality for generating a model. Other arrangements of user interface panels, the information displayed in a panel, and the input that can be received by a panel, are contemplated in various other embodiments.

Panel 210 includes an identifier 211 indicting the number charts and plots generated for selected features. In this example, the identifier 211 indicates that there are four feature charts and a total of six plots of features. The plots are displayed in panel 250 in feature charts 252, 256, 260, and 264. A description of the processing performed on time series data associated with each plot of the feature can be displayed in the description of a plot. For example, what type of smoothing was done to the time series data. As an example, chart 252 includes two plots 254, a first plot of feature 1 and a second plot of feature 1. Chart 256 includes one plot 258 of feature 2. Chart 260 includes one plot 262 of feature 3. Chart 264 includes two plots 266, a first plot of feature 4 (target) and a second plot of feature 4 (model). Time series data associated with a feature is the starting point for the respective plot. That is, the plot is based on the time series data associated with the feature. A plot may represent the time series data without any modification. Or the plot may represent the time series data after it has been processed by, for example, averaging, smoothing, downsampling, removal of outliers etc. In other examples, including other parts of an iterative modeling process, additional feature charts or fewer feature charts may be generated and displayed, and in each feature chart additional plots, less plots, or other plots may be generated and displayed.

Below the identifier 211 panel 210 lists features 212, 214, 216, and 218 that have been selected to be used as an input, a target or a model output. For each feature 212, 214, 216, and 218, panel 210 also lists the plots that are defined for each of these features, and a description indicating a definition of the plot. For example, plots 213 including plot 1-6 are defined for feature 212, plots 215 including plots 1-4 are defined for feature 214, plots 217 including plots 1-3 are defined for feature 216, and plots 219 including plots 1-3 are defined for feature 218. Any of the plots listed for a feature can be selected. The selected plots can be generated and displayed in panel 250. As illustrated in panel 210 in panel 250, a feature may have plots defined in panel 210 that are not selected to appear in a feature chart in panel 250. For example, feature 1 has 6 plots listed in panel 210 but only plot 1 and plot 2 are displayed in chart 252. In operation, a user may generate a number of plots for each feature where each plot is processed (e.g., averaged) differently. Any of the plots may then be selected, and iteratively selected, as desired, to be displayed and used to generate a model.

In an example, features 212, 214, and 216 each relate to a sensor, and these features are used as an input for a model being generated by the system. Feature 218 relates to an output or a result of the system/event being modeled (for example, a flow rate) and this feature can be represented as a target and as a model output. Accordingly, the two plots in chart 252 depict two representations of feature 1, either of which can be selected as feature 1 input data to be used to generate a model. The plot in chart 256 is one representation of feature 2 which can be selected as feature 2 input data and used to generate the model. The plot in chart 260 is one representation of feature 3 which can be selected as feature 3 input data and used to generate the model. The plots in chart 264 are two representations of feature 4. Plot 1 represents feature 4 as a target, and can be based on collected time series data associated with feature 1. Plot 2 represents feature 4 as a model, and is based on the determined output of a selected model using selected features (and in particular, a plot of each selected feature) as input to the model. During a modeling operation, a user can iteratively select different plots as input, and the user interface 200 visually depicts how each selection affects the model. For example, each time a selection of a plot or parameter is made, the user interface immediately depicts graphically the output of the model.

Panel 230 illustrates an example of certain information and functionality presented on a user interface 200 of a model generation system, according to one embodiment. Panel 230 also illustrates certain user inputs that can be received by the panel 230 to determine certain aspects or parameters for generating a model. As one of ordinary skill in the art will appreciate, such information and functionality, and other information functionality related to generating a model, may be displayed and arranged in many ways, and thus this is just one way such information functionality may be presented on the user interface 200.

In this example, panel 230 includes a feature selection input 231 portion configured to receive a user input indicating which features to use as input to the model. As each feature may be depicted in one or more plots, the feature selection input 231 can be configured to receive a user selection of a feature depicted in a particular plot that is generated based on the feature. For ease of selection, the feature selection input 231 can include a pulldown menu 232 that lists available features and plots that may be selected. In an embodiment, the features/plots that can be selected in the pulldown menu 232 can be the ones shown in panel 210. The user may add features as inputs by iteratively selecting one or more features using the pulldown menu 232. The user may also delete any of the displayed features/plots from being an input. Accordingly, this functionality allows a user to easily and quickly add and delete features and their corresponding plots to be used as input to a model. As user input is received by the system to add or delete the features/plots, the system immediately updates the charts of the feature inputs and the model outputs shown in panel 250 to reflect the user's input, such that the user can immediately see in a graphical plot format the time series data associated with each selected feature being used as an input and the resulting time series data of the model based on the inputs.

Still referring to the example in FIG. 2, panel 230 also includes a model type selection input 234 configured to receive user input indicating the current model to be used. For example, the model that is displayed in chart 264. For ease of selection, the model type selection input 234 can include a pulldown menu 235 that lists available models, and a user selection of a model can be received by the user interface 200. Accordingly, this functionality allows a user to easily and quickly add and delete models. In some embodiments, the user interface 200 may be configured to allow the selection of two or more models which are generated and displayed in panel 250. This can be useful for modeling one or more time intervals with a first model, and modeling one or more other time intervals with a second model. In some embodiments, more than two models can be selected for different portions of the time period being modeled. As user input is received by the system to add or delete a model, the system immediately updates the charts of the model shown in panel 250 to reflect the user's model selection, such that the user can immediately see the results of the newly selected model.

In an embodiment, if a user wants to use a model not available as a model type 234 in the panel 230, the user can optionally open a new panel to view model parameters, and manually revise the model. When the revisions of the model are complete, the model can be saved and it can appear on the model selection list.

In the embodiment illustrated in FIG. 2, panel 230 also includes a fit intercept 236 input which determines whether to add a constant term to the feature. The user interface 200 can receive a user input selecting a fit intercept option from a fit intercept pulldown menu 235. Various fit intercepts can add either a positive or negative number to the feature to shift the generated plot of the feature along the y-axis of a chart. For example, a fit intercept option can add a constant term to the feature (that is, a zero or "true" fit intercept) to shift the feature along the y-axis.

During a modeling process of a system or event, a model is determined to as closely as possible replicate an actual output (target) of the system or event, as it operates or occurs over a period of time. The features are associated with time series data for the designated period of time. As described above, plots representing the features are used as input to the model. Each plot can be generated by using unmodified time series data, of modified time series data. For example, modified by averaging, smoothing, down sampling, etc. the time series data. As part of the modeling process, a selected model is "trained" to replicate the target of the system or event using a number of the plots. Thus, a user can affect the training of a model by selecting certain plots as inputs to the model, and changing how each plots is generated. In some embodiments, selected plots are used to train the model for an entire designated period of time that the system operates, or the event occurs. Alternatively, certain portions of the designated period of time can be selected as training intervals. For any designated period of time, two or more training intervals may be selected. Each training interval can be a period of time defined by a start time and an end time. By selecting certain training intervals to train the model, periods of time where the input plots have irregular data can be excluded as an input to the model. This enables users to avoid training models on periods of anomalous data. For example, for example, during startup or shutdown of certain components in a system. In addition, during each training interval, certain plots can be selected to be used as input to the model, such that different plots are used to train the model during different training intervals. In some embodiments, a model for the designated period of time may be generated using more than one model, each of the models being used and trained during a different training interval.

Training a model generally refers to using time series data associated with certain features as input to a model to "fit" the model to the selected target. In a training interval, the selected model is trained to fit to time series data of the selected features and plots. As illustrated in FIG. 2, panel 230 includes a training interval input 238 which allows the user interface 200 to receive input selecting a training interval. The training interval input 238 can include a training interval pulldown menu 239 for selection from a list of training intervals. The current training intervals 240 can be displayed in a list of time intervals 241. A training interval is a defined period of time, having a start time and an end time. In some embodiments, the training intervals can be determined by receiving user input indicating a start time and a stop time for a training interval. In some embodiments, a user may graphically select a portion of plots shown in panel 250 and define the selection to be a training interval. The training interval selection, and the above-described functionality for plot generation and selection of inputs and models, allows a user to visually review displayed plots, generate new plots as desired to clean the data used as input, select a model, and then select specific training intervals where the user believes the data is most sufficient (e.g., less erroneous) for a particular training of the model.

Figure 4:
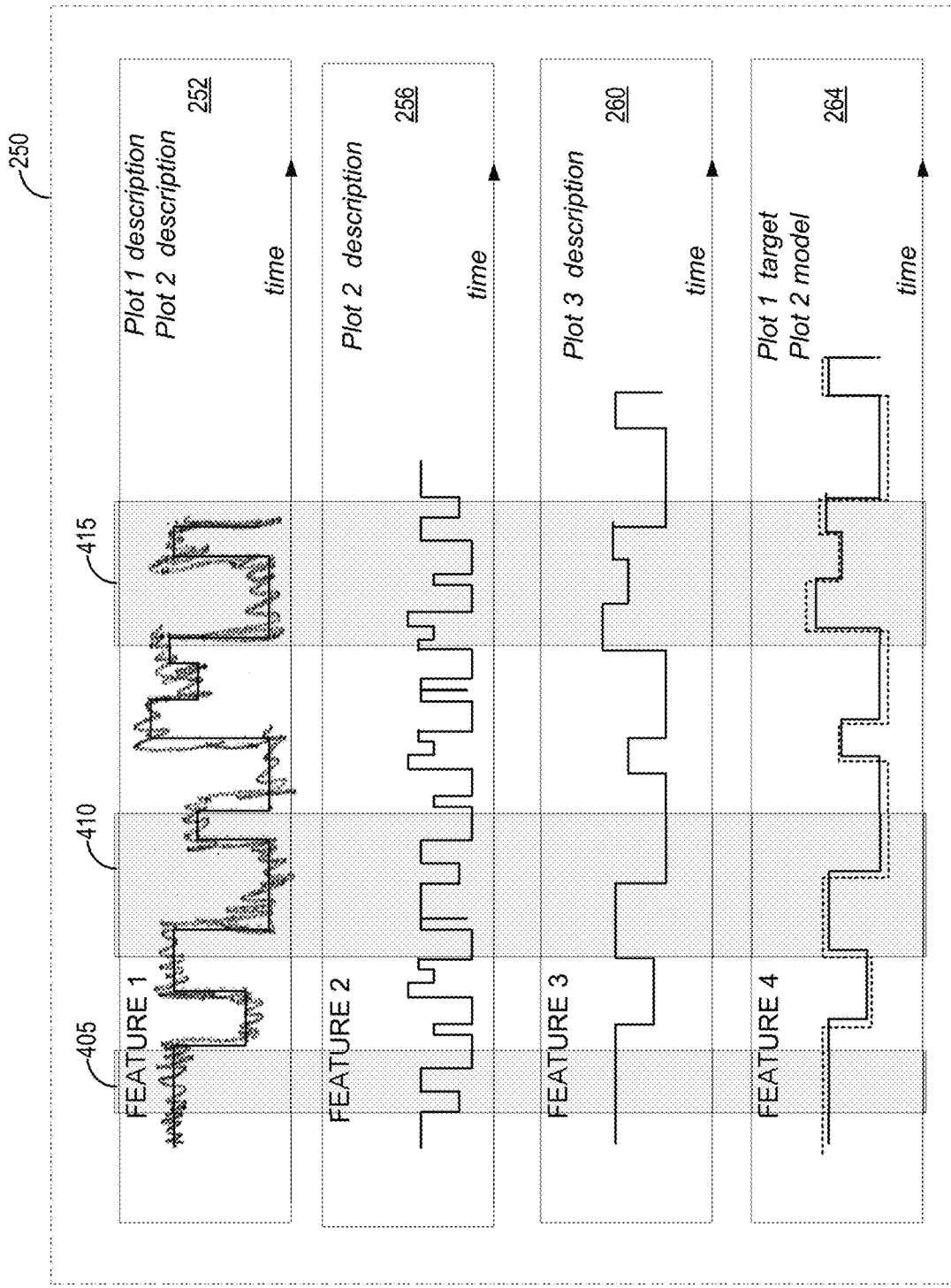
FIG. 4 is a schematic illustrating an example of a user interface that graphically depicts multiple training intervals temporally aligned with graphically depicted the feature plots, a target plot, and a model plot, each training interval representing a period of time to train a selected model with time series data associated with the selected features.

As an example of, FIG. 4 illustrates a user interface 250 that graphically depicts multiple training intervals 405, 410, 415. using time series data associated with the selected features. The training intervals 405, 410, 415 are temporally aligned across the charts 252, 256, 260 graphically depicting feature plots used as input to the modeling process. The training intervals 405, 410, 415 are also temporally aligned across chart 264 graphically depicting a feature plot of a target (e.g., plot 1) and a feature plot of the output of a selected model (e.g., plot 2). Graphically depicting the training interval over the feature charts allows a user to visually and precisely select the portion of features that are desired to be used for training of the model. For example, if a feature used as input to a model is exhibiting abnormal data in during a particular time period (e.g., during startup of a system, during an idle period, or for unknown reasons), by having the features graphically displayed and aligned on the user interface, a user can more easily define one or more training intervals to avoid the periods of abnormal data. As another example, in a time period where certain selected features exhibit abnormal data, a training interval can be defined for that time period and other features can be selected to be used as input during that training interval.

Panel 230 also includes a weighting input 242 and a sampling input 243 that provide further options for processing feature data used as an input to the model. The weighting input 242 allows the user interface 200 to receive a user input indicating how much to "weight" a particular plot that uses input to the model, such that a plot with a higher weight may contribute more than a plot with a lower weight when determining how well the model fits (e.g., the loss). In one embodiment, the default weighting of the is uniform weighting.

The sampling input 243 allows the user interface 200 to receive a user input indicating sampling to apply to a feature used as an input to the model. The underlying times series of the input features may be very dense. Accordingly, for performance reasons, a user may want to downsample an input before training a model. The sampling may include several options, for example, a sampling type 249 which can be input using a sampling type pulldown menu 245, and/or a sampling method 246 which can be input using a sampling method pulldown menu 247. In an example, one option for the sampling type 249 can be None or no sampling, and all of the data in the underlying time series data will be used. Another option can be Count which can be selected to cut each training interval into a certain number of "buckets" (which may be user entered or set as a default). Another option can be Time which directly selects a time interval (or bucket) for the sampling. For the Count and Time sampling options, a sampling method can be selected using the sampling method pulldown menu 247. The sampling method can determine which points from each bucket are used. In an embodiment, the sampling method can include an option of Mean, which indicates to use a middle of the bucket in time with value equal to the mean of all the points in the bucket. In an embodiment, the sampling method can include an option of Extrema, which indicates to use the outermost points (first, last, smallest, largest) points in each bucket Panel 250 illustrates an example of certain information and functionality presented on a user interface 200 of a model generation system, according to one embodiment. As described above, panel 250 can graphically display one or more charts each chart being associated with a feature. Accordingly, although panel 250 illustrates four charts 252, 256, 260, 264, more or fewer charts may be generated and displayed. Each of the charts may include one or more plots that are generated using time series data of the associated feature, the plot representing the time series data after it has been processed in accordance with how the plot has been defined. The arrangement of the charts can be temporally aligned to allow easier comparison between the plots. Within any chart, the plots are temporally aligned and superimposed also to allow easier comparison between the plots. Panel 250 can also be configured to receive a user selection of one or more training intervals by indicating the selection of the training intervals with a pointing device on the panel 250.

The graphical user interface 200 is an example of a user interface that is configured to take advantage of the underlying association of data defined by an ontology to create a model. A feature that includes time series data can be associated by an ontology to several data objects, for example, a sensor, a system, and/or a batch. The user interface can allow a user to select feature plots of time series data associated with one batch, or one system, and generate a model of the batch or system. Then using the ontology, the user interface can allow a user to select feature plots of time series data associated with another batch, or another system, and further train the model. For example, the user interface can be configured to receive user selections of model input features and a target associated with a first operational time period of a system and train a model, and then receive user selections of corresponding model input features and a target associated with a second operational time period of the system and further train (or refine) the model. The flexibility of the user interface, and the associations defined by the ontology, allows data visualization and rapid model generation of large time series data sets, providing better understanding and a "feel" for the data being used as an input to the model and for the resulting model output.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 3:
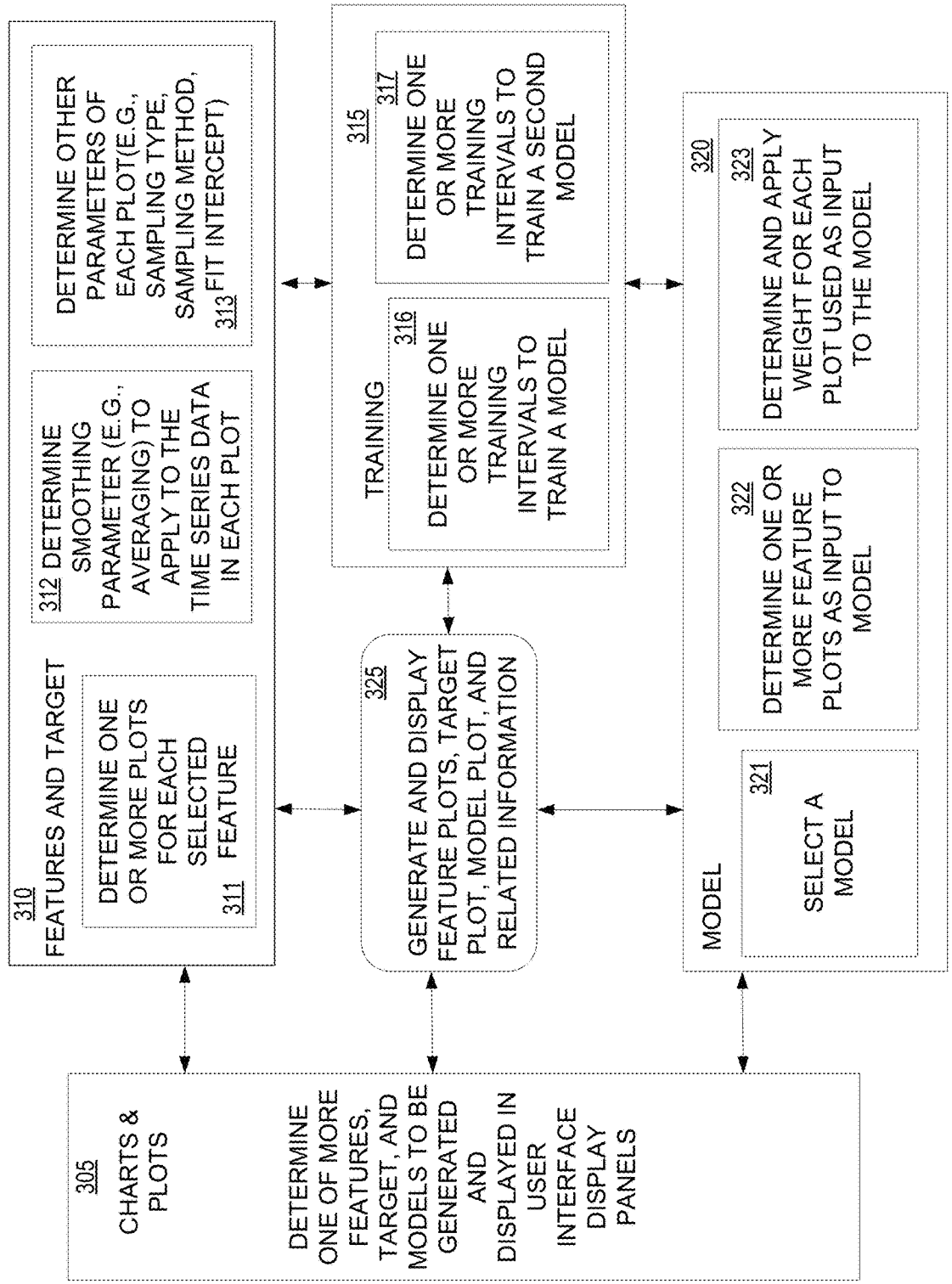
FIG. 3 is a block diagram illustrating examples of model generation functionality that can be performed using the interface of FIG. 2 using an ontology.

FIG. 3 is a block diagram illustrating examples of model generation workflow functionality that can be performed by a user using the user interface illustrated in FIG. 2, according to various embodiments. That is, the user interface is configured to receive user inputs for the described operations, and the modeling system performs the operation based on the user input. The examples of functionality described in reference to blocks 305, 310, 315, 320 and 325 is not intended to be performed linearly, although it can be. Instead, the functionality can be performed in any order, and can be iteratively repeated, to quickly produce a model using graphically depicted plots and data objects (features, batches, systems, or events, etc.) associated by an ontology. Any change to a feature or a feature parameter results in the change being immediately depicted in the displayed feature plots to allow a user to visualize the result of the change. As an example, FIG. 3 is described in reference to modeling a system.

At block 305, a user can select one or more features and they are displayed on a user interface. Each feature can be a model input ("input"), a target, or a model output ("model"). In an example, input features are time series data generated from sensors sensing a parameter of the system; a target feature is time series data generated from a sensor sensing an output of the system; and model feature is a model that is being trained to mimic the target feature. For ease of reference, temporally aligned plots of selected features are generated and displayed in the user interface in block 325. Throughout the modeling process, the user can change the inputs, target and model, and parameters relating to the inputs, targets and model as described with reference to features and target blocks 310 and model block 320. With each change, corresponding plots of the inputs, target, and model are immediately re-generated and displayed.

In block 310, a user can select features used as inputs and a target, and parameters of the features, which affect the displayed plots and data that is provided to the model. For example, in block 311, a user can determine one or more plots for the inputs and the target. In block 312 a user can determine smoothing characteristics of a plot, for example, remove outliers or use an averaging technique on the data that produces a plot. In block 313, a user can determine sampling criteria on data that produces a plot. For example, a sampling type, a sampling method, a fit intercept, etc.

In block 315, a user may provide input to control training of the model. For example, in block 316, a user may determine one or more training intervals during which to train a model. At block 317, for an embodiment that uses multiple models to generate an overall model, the user may provide input to determine which model to use for a particular training interval.

In block 320, a user can provide input to determine a model and characteristics of a model. For example, in block 321 a user can select a model from the user interface, and the model is immediately generated and graphically displayed based on the inputs. If a new model is selected, the new model is immediately generated and displayed, allowing a user to quickly try different models. In block 322 a user can provide input to determine one or more inputs for the model, and with each selected input a new model plot is generated. In block 323 a user can provide input to determine a weight to be applied to each input, and with each change in weight a new model plot is generated. At block 325, the user interface generates and displays plots of the inputs, target, and model in temporally aligned charts whenever any changes are made to the features.

The model generation workflow is facilitated by information associated by an ontology. In one example, once a model has been trained using certain portions of certain features associated with a system for a certain batch, the model can be further trained using corresponding features associated with the same system in a different batch. In another example, once a model has been trained using certain portions of certain features associated with a first system, the model can be further trained using corresponding features associated with a similar second system (e.g., an identically configured system performing the same operation). Input related to any of the functionality illustrated in blocks 305, 310, 315, 320, and 325, and can be received by the system at any time, and the results of the input are immediately reflected in the plots and information displayed on the user interface. This flexible workflow allows rapid and iterative refinements of model input data and visual plot-based generation of a model.

Object-Centric Data Model

Figure 5:
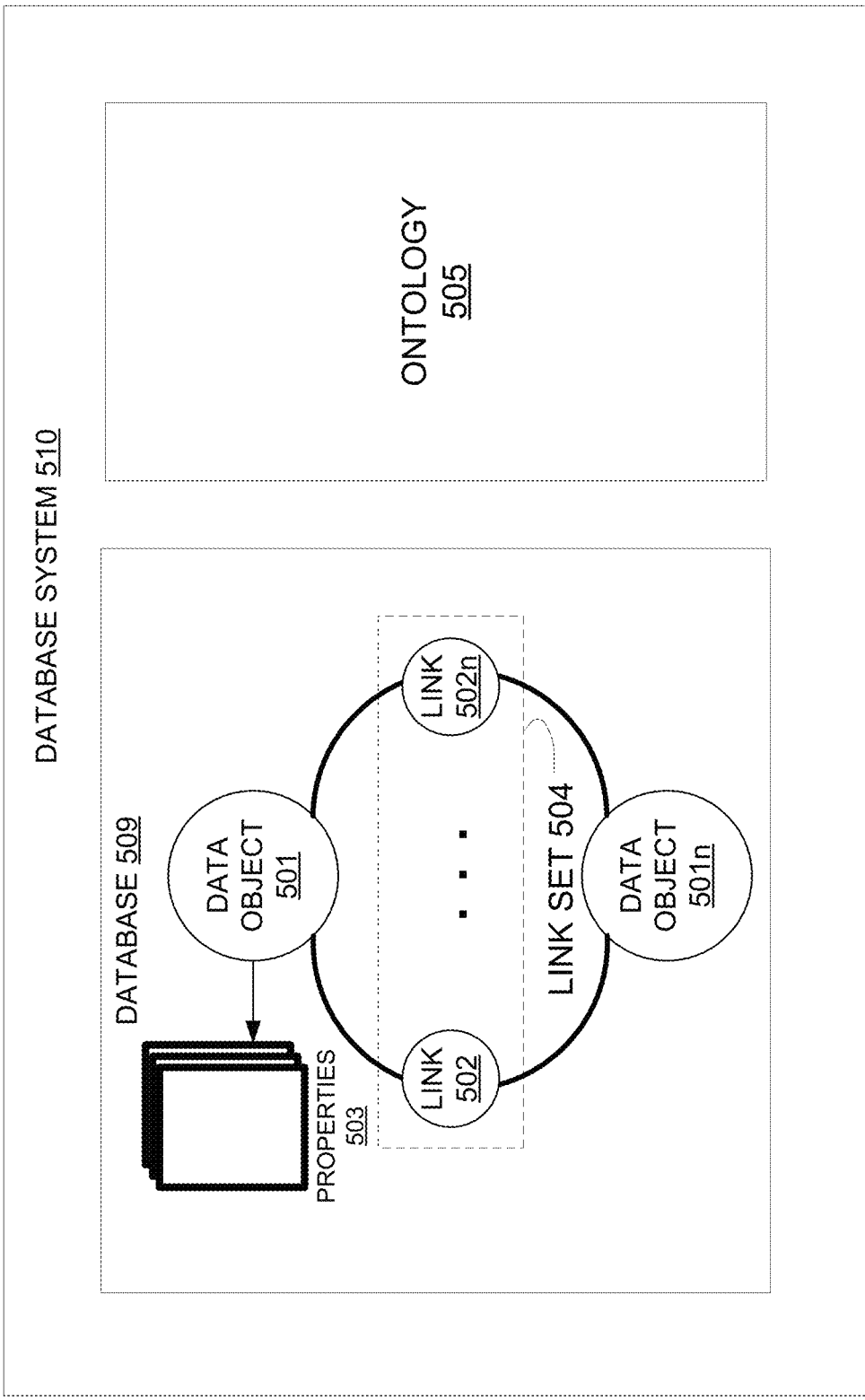
FIG. 5 illustrates one embodiment of a database system using an ontology.

FIG. 5 illustrates one embodiment of a database system using an ontology. An ontology may provide a data model for storage of time series data and information. To provide a framework for the discussion of specific systems and methods described herein, an example database system 510 using an ontology 505 will now be described in reference to FIG. 5. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 505. The conceptual data model is independent of any particular database used for durably storing one or more database(s) 509 based on the ontology 505. For example, each object of the conceptual data model may correspond to one or more rows in a relational database or an entry in Lightweight Directory Access Protocol (LDAP) database, or any combination of one or more databases.

FIG. 5 also illustrates an object-centric conceptual data model according to an embodiment. An ontology 505, as noted above, may include stored information providing a data model for storage of data in the database 509. The ontology 505 may be defined by one or more object types, which may each be associated with one or more property types. At the highest level of abstraction, data object 501 is a container for information representing things in the world.

For example, data object 501 can represent an entity such as a person, a place, an organization, a market instrument, or other noun. Data object 501 can represent an event that happens at a point in time or for a duration. Data object 501 can represent a document or other unstructured data source such as an e-mail message, a news report, or a written paper or article. Each data object 501 is associated with a unique identifier that uniquely identifies the data object within the database system.

Different types of data objects may have different property types. For example, a "Person" data object might have an "Eye Color" property type and an "Event" data object might have a "Date" property type. Each property 503 as represented by data in the database system 510 may have a property type defined by the ontology 505 used by the database 509.

Objects may be instantiated in the database 509 in accordance with the corresponding object definition for the particular object in the ontology 505. For example, a specific monetary payment (e.g., an object of type "event") of US$30.00 (e.g., a property of type "currency") taking place on Mar. 27, 2009 (e.g., a property of type "date") may be stored in the database 509 as an event object with associated currency and date properties as defined by the ontology 505. In another example of an event object, a batch (e.g., an object of type "batch") in a process step or location in the process (e.g., a property of type "event") starting on Mar. 27, 2009 (e.g., a property of type "date") at 0805:00 (e.g., a property of type "start time") and completing on Mar. 27, 2009 (e.g., a property of type "date") at 1515:15 (e.g., a property of type "time") on (or monitored by) system 1 (e.g., a property type of "system"). In another example, a specific sensor (e.g., an object of type "sensor") used in a system (e.g., a property of type "system") can collect time series data (e.g., a property of type "data") along with times associated with the data (e.g., a property of type "time"). The data objects defined in the ontology 505 may support property multiplicity. In particular, a data object 501 may be allowed to have more than one property 303 of the same property type. For example, a "Person" data object might have multiple "Address" properties or multiple "Name" properties. In another example, a batch in a process run may have multiple "sensor" properties indicating that multiple sensors collected monitored the batch to collect time series data.

Each link 502 represents a connection between two data objects 501. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. In one embodiment, when two data objects are connected by an event, they may also be connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In another example, two "Batch" data objects representing two batches that were monitored by the same system may both have a "Sensor" property that indicates the sensor that was used to monitor each of the batches. If both batches were monitored by the same system (e.g., at different times), then both batches may have one or more "Sensor" properties that are likely similar, if not identical, indicating one or more of the same sensors were used to collect time series data for each of the batches. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 501 can have multiple links with another data object 501 to form a link set 504. For example, two "Person" data objects representing a husband and a wife could be linked through a "Spouse Of" relationship, a matching "Address" property, and one or more matching "Event" properties (e.g., a wedding). In another example of matching event properties, two or more batches can include one or more of the same event properties, which indicates the tool more batches have undergone the same event. Accordingly, by selecting a group of batches and selecting an event which is common to each batch in the group of batches, time series data for each of these batches may be displayed in a user interface in one or more plots such that it is temporally aligned for comparison. The time series data may include one or more time series sensor data. In an example, the temporal alignment of a first plot of time series data to a second plot of time series data aligns a portion of a first subset of time series data with a portion of a second subset of time series data in the chart in a vertical or horizontal corresponding direction such that points of the first plot and the second plot along the corresponding direction represent the same point in time relative to the start of the respective first batch and second batch. Each link 502 as represented by data in a database may have a link type defined by the database ontology used by the database.

Figure 6:
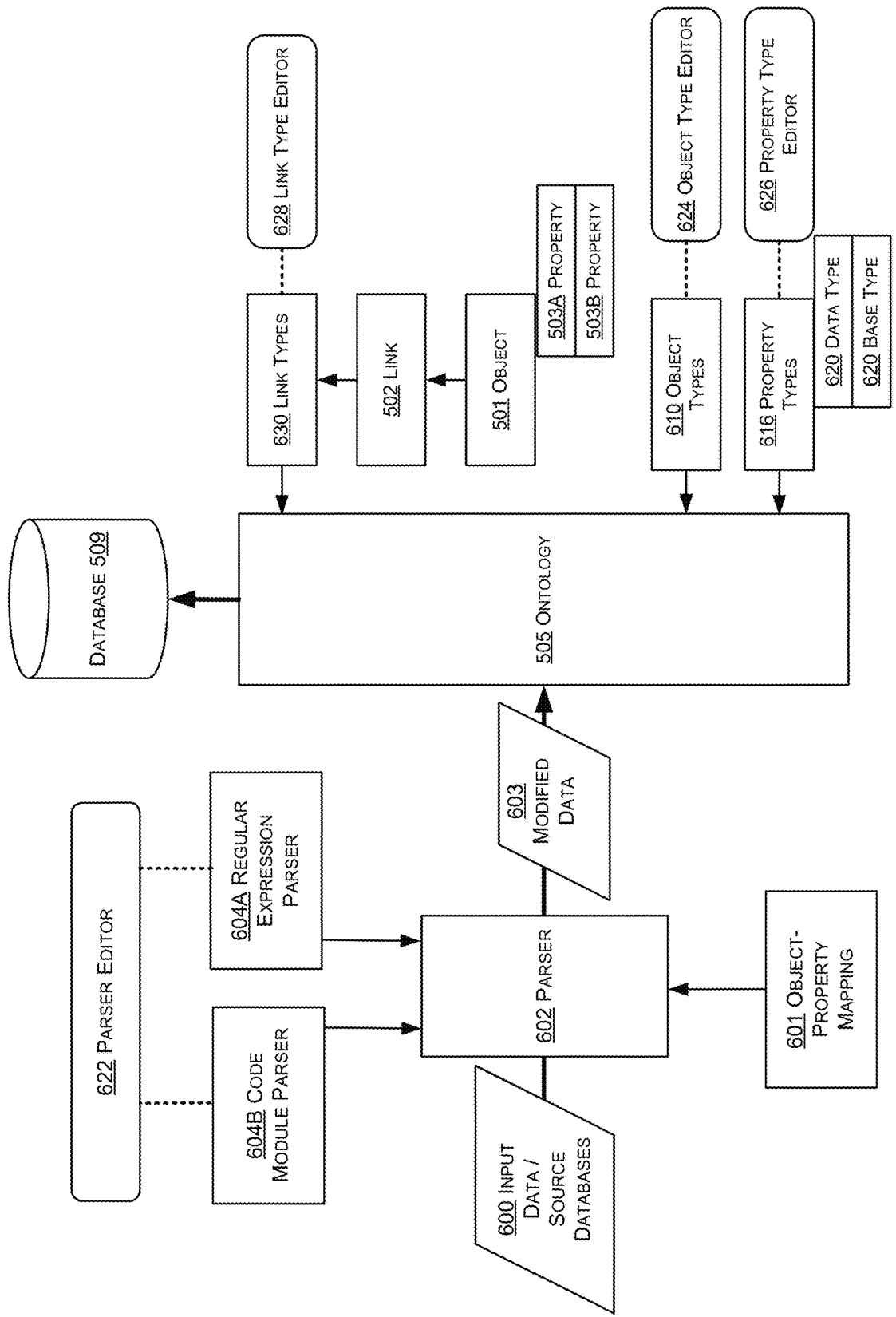
FIG. 6 illustrates one embodiment of a system for creating data in a data store using a dynamic ontology.

FIG. 6 illustrates one embodiment of a system for creating data in a data store using a dynamic ontology. In this example, the ontology may be configured, and data in the data model populated, by a system of parsers and ontology configuration tools. In the embodiment of FIG. 6, input data 600 is provided to parser 602. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. In another example, a system performing a process may be in communication with one or more databases with information about sensors that monitor the process and phases of the process. The databases may contain a variety of related information and attributes of each type of data, for example, related to multiple sensors that collect data during the process, phases of the process, data sensed by a sensor, time stamps of sensor data, and corresponding information related to the process or particular phases of the process. The parser 602 is able to read a variety of source input data types and determine which type of data it is reading.

In accordance with the discussion above, the example ontology 605 comprises stored information providing the data model of data for storage of data in database 609. The ontology 505 stored information provides a data model having one or more object types 610, one or more property types 616, and one or more link types 630. Based on information determined by the parser 602 or other mapping of source input information to object type, one or more data objects 501 may be instantiated in the database 509 based on respective determined object types 510, and each of the objects 501 has one or more properties 503 that are instantiated based on property types 516. Two data objects 501 may be connected by one or more links 502 that may be instantiated based on link types 630. The property types 616 each may comprise one or more data types 620, such as a string, number, etc. Property types 616 may be instantiated based on a base property type 620. For example, a base property type 620 may be "Locations" and a property type 616 may be "Home."

In an embodiment, a user of the system uses an object type editor 624 to create and/or modify the object types 610 and define attributes of the object types. In an embodiment, a user of the system uses a property type editor 626 to create and/or modify the property types 616 and define attributes of the property types. In an embodiment, a user of the system uses link type editor 628 to create the link types 630. Alternatively, other programs, processes, or programmatic controls may be used to create link types and property types and define attributes, and using editors is not required.

In an embodiment, creating a property type 616 using the property type editor 426 involves defining at least one parser definition using a parser editor 622. A parser definition comprises metadata that informs parser 602 how to parse input data 600 to determine whether values in the input data can be assigned to the property type 616 that is associated with the parser definition. In an embodiment, each parser definition may comprise a regular expression parser 604A or a code module parser 604B. In other embodiments, other kinds of parser definitions may be provided using scripts or other programmatic elements. Once defined, both a regular expression parser 604A and a code module parser 604B can provide input to parser 602 to control parsing of input data 600.

Using the data types defined in the ontology 505, input data 600 may be parsed by the parser 602 determine which object type 610 should receive data from a record created from the input data, and which property types 616 should be assigned to data from individual field values in the input data. Based on the object-property mapping 601, the parser 602 selects one of the parser definitions that is associated with a property type in the input data. The parser parses an input data field using the selected parser definition, resulting in creating new or modified data 603. The new or modified data 603 is added to the database 509 according to ontology 505 by storing values of the new or modified data in a property of the specified property type. As a result, input data 600 having varying format or syntax can be created in database 509. The ontology 505 may be modified at any time using object type editor 624, property type editor 626, and link type editor 628, or under program control without human use of an editor. Parser editor 622 enables creating multiple parser definitions that can successfully parse input data 600 having varying format or syntax and determine which property types should be used to transform input data 600 into new or modified input data 603.

A user interface may show relationships between data objects. Relationships between data objects may be stored as links, or in some embodiments, as properties, where a relationship may be detected between the properties. In some cases, as stated above, the links may be directional. For example, a payment link may have a direction associated with the payment, where a person object is a receiver of a payment, and another person object is the payer of payment.

In addition to visually showing relationships between the data objects, a user interface may allow various other manipulations. For example, the objects within a database 309 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data and generate models rapidly and in a more analytically useful way. Graphical user interfaces allow the user to visualize otherwise difficult to define relationships and patterns between different data objects. In the example of a system preforming a modeling process and being in communication with one or more databases with information about sensors that monitor the process and phases of the process, a graphical user interface can display time series sensor data of one or more sensors and used for generating a model, and then other time series sensor data of one or more sensors can be displayed and used for refining the model. Time series sensor data used as an input to the model preprocessed (e.g., to remove noise), used as a target for a model to mimic, or generated as a result of a modeling process can be displayed in plots in a relative time scale such that the data at the beginning of each plot is aligned to be at the same point in the process to help identify correlations in the data. Such time series sensor data has been parsed and stored in one or more data objects with properties and relationships as defined by an ontology. This allows a user, through the user interface, to quickly and easily select for display in one or more plots aligned time series sensor data of certain sensors, processes (or batches), models, systems etc., and at a desired scale/time period of the displayed. The present disclosure allows for easier comparison of time series data of (model input) features and resulting models that were generated at times, and/or in different systems. The present disclosure also allows faster analysis of time series data and model generation by allowing quick and accurate access to selected portions of time series sensor data which may have been collected by different sensors in different systems, or the same sensors of the same system but during different processes of a repetitively run process. Without using the present disclosure, quickly selecting, displaying, and analyzing time series data, and making use of known relationships associated with time series data to generate models would be virtually impossible given the size and diversity of many users' present databases, (e.g. excel spreadsheets, emails, and word documents).

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

Certain methods can be used to transform data and create the data in a database using a dynamic ontology. In one example, input data is received. In an embodiment, an input data file is received. The input data file may comprise a comma-separated value (CSV) file, a spreadsheet, XML or other input data file format. Input data 300 of FIG. 3 may represent such file formats or any other form of input data.

Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 305 stored in database 309, may be stored as graphs or graph-like relationships (which may comprise data structures or databases), referred to collectively as "graphs." Some examples of graphs include an undirected graph, clusters, and adjacency lists that allow storing of graphs in memory efficiently, particularly where the graphs are lightly-connected graphs or clusters (e.g. graphs or clusters wherein the number of nodes is high compared to the number of linkages per node). Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

For the systems and methods described herein, for example in reference to FIGS. 1, 2, 3, 4, 8, 9 and 10, an ontology provides a data model for storage of time series data objects in association to other data objects. By recognizing the ontological relationships and links between a first data object and one or more time series data objects, an operation can be determined for a first data object and one or more associated time series, and then a similar operation can be performed on a second data object and it's one or more associated time series, a process sometimes referred to herein as "pivoting."

FIG. 7 is an example of an embodiment of an example of a computer system 700 that can implement the embodiments described herein. Computer system 700 includes a bus 702 or other communication mechanism for communicating information, and a hardware processor, or multiple processors 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The main memory 706 can, for example, include instructions to allow a user to display features, smooth/filter time series data associated with a feature, determine and set model parameters, select features as input for the model, determine one or more intervals of time for training the model, and display output of the model as described in reference to FIGS. 1-4. The main memory 706 can also, for example, include instructions to allow a user to manipulate time series data to store the time series data in data objects as defined by an ontology, as described in reference to FIG. 5.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 818 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Accordingly, in some embodiments, of the computer system 700, the computer system 700 comprises one or more non-transitory computer storage mediums 710 configured to at least a plurality of data objects, the data objects associated with respective object types; a plurality of time series, the time series associated with respective series types, the time series further associate with respective data objects; an ontology defining relationships among object types and series types; and computer-executable instructions. The computer system 700 further comprises one or more computer hardware processors 704 in communication with the one or more non-transitory computer storage mediums 710, the one or more computer hardware processors 704 configured to execute the computer-executable instructions to at least: The computer system 700 can include many other aspects. In an embodiment, the one or more computer hardware processors 704 of the computer system 700 are further configured to execute the computer-executable instructions to cause presentation of a user interface configured to receive a first user input selecting a first model from a list of one or more models for modeling a system. The one or more computer hardware processors 704 of the computer system 700 are further configured to execute the computer-executable instructions to generate and display, in the user interface, a first chart depicting a first time series data set, the first time series data set depicting data from a first sensor, generate and display, in the user interface, a second chart depicting a second time series data set, the second time series data set depicting a target output of the apparatus, receive a second user input including a selection of a portion of the a time series data set; and generating and displaying a third chart depicting a third time series data set depicting an output of the selected model, the third chart of the model output aligned with the second chart of the target output and updated in real-time in response to the second user input.

Figure 8:
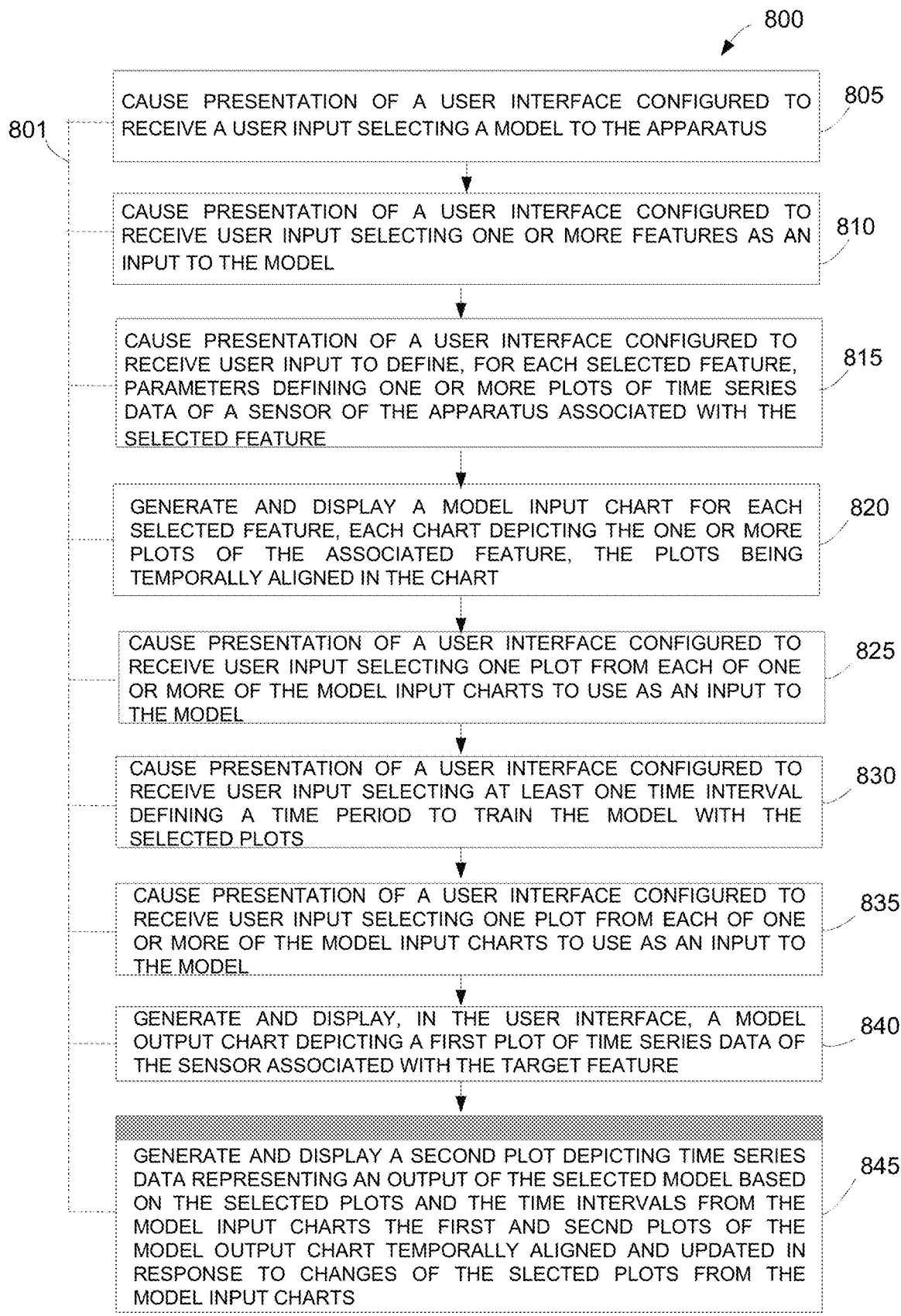
FIG. 8 is a flowchart illustrating an example of a process 800 for generating a model, according to an embodiment.

FIG. 8 is an example of a flowchart illustrating an embodiment of a process 800 for generating a model of a system. The one or more processors 704 of the computer system 700 illustrated in FIG. 7 may perform the process 800. Process 800 illustrates an example of functionality that is described, for example, in reference to FIGS. 1, 2, 3, and 4. In various embodiments, process 800 may include one or more other aspects, for example, any of the functionality described herein relating to FIGS. 1, 2, 3 and 4. the process 800 may In an example of the process 800, at block 805, the process 800 causes presentation of a user interface configured to receive a user input selecting a model to model the apparatus. The selection of a model can be from a pulldown list of models. At block 810, the process causes presentation of a user interface configured to receive user input selecting one or more features as an input to the first model. At block 815, the process causes presentation of a user interface configured to receive user input to define, for each selected feature, parameters defining one or more plots of time series data of a sensor of the apparatus associated with the selected feature. At block 820, the process 800 generates and displays in the user interface, a model input chart for each selected feature, each chart depicting the one or more plots of the associated feature, the one or more plots being temporally aligned in the chart. At block 825, process 800 causes presentation of a user interface configured to receive user input selecting one plot from each of one or more of the model input charts to use as an input to the selected model.

The process 800 can continue at block 830 causing presentation of a user interface configured to receive user input selecting at least one-time interval plot defining a time period to train the model with the selected plots. At block 835, the process 800 causes presentation of a user interface configured to receive a user input selecting a target feature for the model to mimic, the target feature comprising time series data associated with a sensor of the apparatus. At block 840, the process 800 generates and displays in the user interface, a model output chart depicting a first plot of time series data of the sensor associated with the target feature. And at block 845 the process 800 generates and displays, in the user interface and on the model output chart, a second plot depicting time series data representing an output of the selected model based on the selected plots and the timing interval from the model input charts, the first and second plot of the model output chart temporally aligned and updated in real-time in response to changes of the selected plots from the model input charts.

Although process 800 is illustrated as a flowchart, the process can be performed in many different ways as part of an iterative modeling process, as indicated by the optional path indictor 801. For example, after causing presentation of a user interface configured to receive user input selecting one or more features as an input to the first model at block 810, the process 800 may cause presentation of a user interface configured to receive user input selecting one or more features as an input to the first model at block 805. Or as another example, after block 810 the process 800 may cause presentation of a user interface configured to receive user input selecting at least one-time interval plot defining a time period to train the model with the selected plots at block 830.

Figure 9:
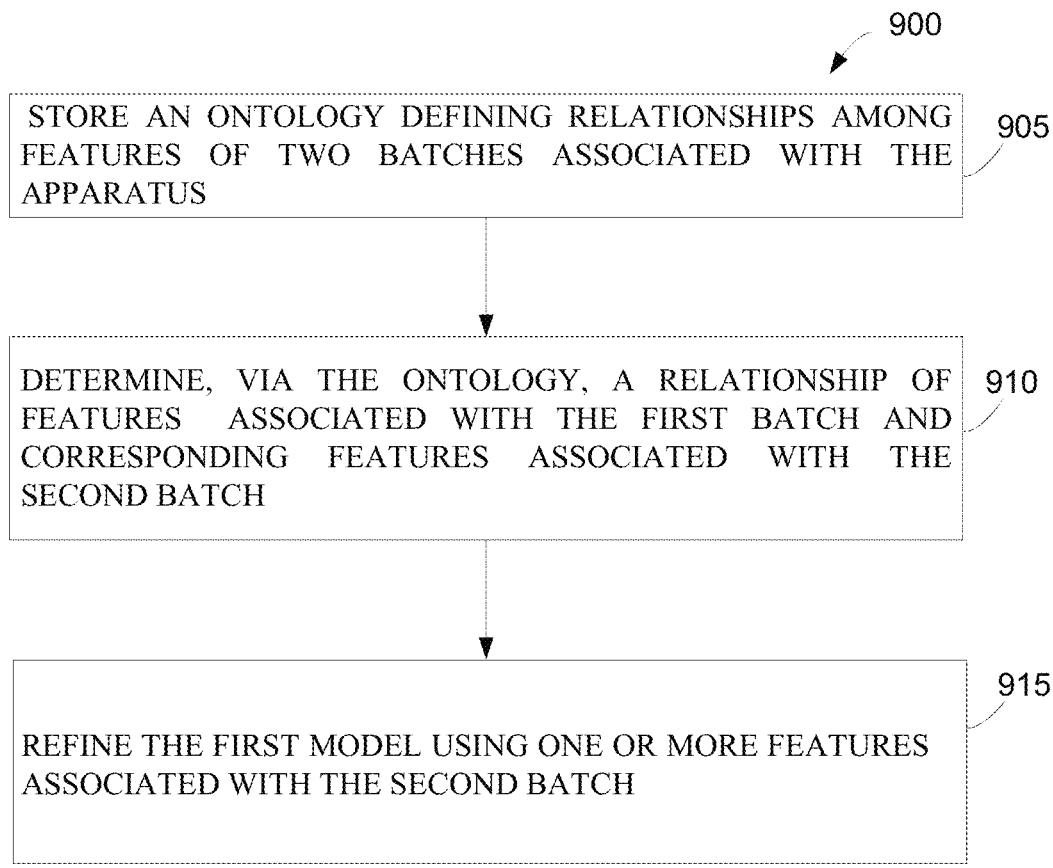
FIG. 9 is a flowchart illustrating an example of a process 900 for generating a model that can be performed with the process illustrated in FIG. 8 according to an embodiment.

FIG. 9 is an example of a flowchart illustrating an embodiment of a process 900 that can be performed to generate a model, along with performing process 800. Process 900 specifically relates to an example of using an ontology in a modeling process. In process 900, features are associated with time series data as defined by an ontology. The features are also associated with a first batch of an apparatus (system or event). After modeling is performed using the features associated with the first batch, using the ontology the modeling process can pivot to use the corresponding features associated with the second batch to further refine the model. Although it may work best when the batches are associated with the same apparatus (e.g., because the same sensors are used to collect the time series data), in an embodiment the batches are associated with a different apparatus, for example, a similarly configured apparatus. The one or more processors 704 of the computer system 700 illustrated in FIG. 7 may perform the process 900. Process 900 illustrates an example of functionality that is described, for example, in reference to FIGS. 1, 2, 3, and 4. In various embodiments, process 900 may include one or more other aspects, for example, any of the functionality described herein relating to FIGS. 1, 2, 3 and 4.

As an example, at block 905, the process 900 stores an ontology defining relationships among features of two batches associated with the apparatus. In various embodiments, the ontology defines relationships among features of more than two batches associated with the apparatus. At block 910, the process 900 determines via the ontology, a relationship of the features selected as an input to the first model associated with the first batch and corresponding features associated with a second batch associated with the apparatus. At block 915, the process 900 refines the first model using one or more features associated with the second batch.

Figure 10:
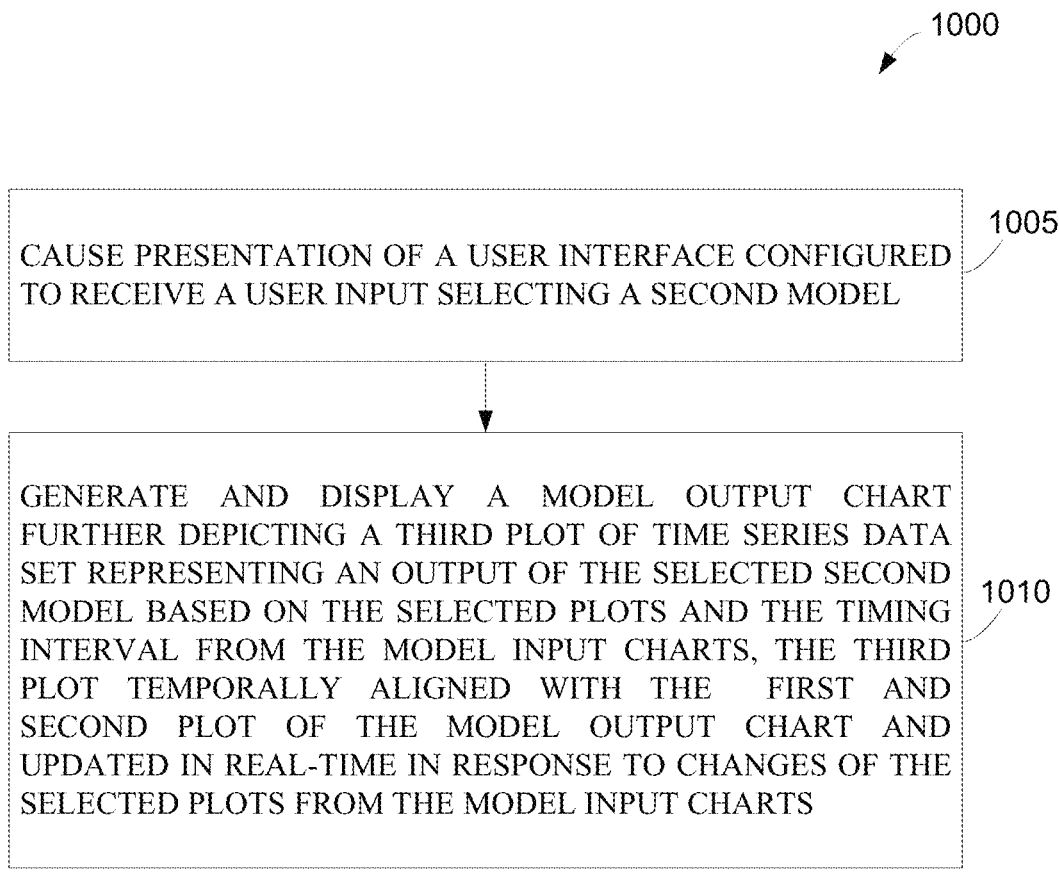
FIG. 10 is a flowchart illustrating an example of a process 900 for generating a model that can be performed with the process illustrated in FIG. 8 according to an embodiment.

FIG. 10 is an example of a flowchart illustrating an embodiment of a process 900 that can be performed for generating a model in conjunction with the process 800. The one or more processors 704 of the computer system 700 illustrated in FIG. 7 may perform the process 1000. Process 1000 illustrates an example of functionality that is described, for example, in reference to FIGS. 1, 2, 3, and 4. In various embodiments, process 1000 may include one or more other aspects, for example, any of the functionality described herein relating to FIGS. 1, 2, 3 and 4.

When generating a model from plots of time series data each associated with a feature, different time periods representing different operational situations (that are reflected in the data) may be best modeled using different models. For example, when an apparatus is operating, during a startup operation, warmup, a high operational level, a low operational level, idle, shutdown, when associated equipment is brought online, etc. After the process 800 has been performed and modeling is performed in certain time intervals, it may be beneficial to improve the modeling by using a different model during certain time intervals. The system can then save the modeling that includes the two or more models. The process 1000 addresses using a second model. In some embodiments, two or more models can be used, each modeling during different time intervals. Accordingly, at block 1005 the process 1000 causes presentation of a user interface configured to receive a user input selecting a second model. The selection of the second model can be from a list of models for modeling the apparatus. For example, the model pulldown menu 235 (FIG. 2) in user interface 200. At block 1010, the process 1000 generates and displays, in the user interface, an updated model output chart further depicting a third plot of time series data set representing an output of the selected second model based on the selected plots and the timing interval from the model input charts, the third plot temporally aligned with the first and second plot of the model output chart and updated in real-time in response to changes of the selected plots from the model input charts.

Various embodiments of the present disclosure may be a system, a method, and/or a computer program product related to generating a model of a system, process or event, at any possible technical detail level of integration. In the context of generating a model of a system, process or event, the system, process or event being modeled may be referred to as an "apparatus" as the modeling uses data (e.g., time series data) collected by one or more components (e.g., sensors). The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user. The term "substantially" when used in conjunction with a number or a range forms a phrase that will be readily understood by a person of ordinary skill in the art. For example, is readily understood that such language will include a number or range were little difference is discernible or matters. For example, the term substantially can mean within 20% of the number or the range.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    one or more computer storage mediums configured to store computer-executable instructions; and
    one or more computer hardware processors configured to execute the computer-executable instructions to cause the system to:
        cause presentation of a user interface configured to receive one or more user inputs selecting two or more features, wherein the two or more features comprise time series data, wherein the two or more features include at least one or more training features usable for training a first model, and wherein the two or more features further include at least a target feature for the first model to mimic;
        generate and cause display, in the user interface, of graphical plots for each of the selected training features and the selected target feature;
        receive selection and cause display, in the user interface, of one or more training intervals associated with the graphical plots;
        cause the first model to be trained based on at least time series data from the one or more training intervals of the one or more training features; and
        generate and cause display, in the user interface, of an output graphical plot of the trained first model.

2. The system of claim 1, wherein the user interface is further configured to receive one or more user inputs selecting the one or more training intervals of at least one of the graphical plots.

3. The system of claim 1, wherein:
    the one or more computer storage mediums are further configured to store an ontology defining relationships among features of two or more batches of data associated with one or more sensors, and
    the one or more computer hardware processors are further configured to execute the computer-executable instructions to cause the system to:
        determine, via the ontology, a relationship of the one or more training features as batches of data associated with the one or more sensors.

4. The system of claim 1, wherein the user interface is further configured to receive one or more user inputs defining one or more parameters to be applied to at least one of the two or more features.

5. The system of claim 4, wherein the one or more parameters include at least one of: smoothing, averaging, downsampling, or removing outliers.

6. The system of claim 1, wherein the first model is at least one of: a machine learning model, a linear model, an elastic net model, or a support vector machine model.

7. The system of claim 1, wherein the user interface is further configured to receive one or more user inputs defining one or more weights to be applied to at least a portion of at least one of the two or more features.

8. A computer-implemented method comprising, by one or more computer hardware processors executing computer-executable instructions:
    causing presentation of a user interface configured to receive one or more user inputs selecting two or more features, wherein the two or more features comprise data, wherein the two or more features include at least one or more training features usable for training a first model, and wherein the two or more features further include at least a target feature for the first model to mimic;
    generating and causing display, in the user interface, of graphical plots for each of the selected training features and the selected target feature;
    receiving selection and cause display, in the user interface, of one or more training intervals associated with the graphical plots;
    causing the first model to be trained based on at least time series data from the one or more training intervals of the one or more training features; and
    generating and causing display, in the user interface, of output graphical plot of the trained first model.

9. The computer-implemented method of claim 8, wherein the user interface is further configured to receive one or more user inputs selecting the one or more training intervals of at least one of the graphical plots.

10. The computer-implemented method of claim 8 further comprising, by the one or more computer hardware processors:
    storing an ontology defining relationships among features of two or more batches of data associated with one or more sensors; and
    determining, via the ontology, a relationship of the one or more training features as batches of data associated with the one or more sensors.

11. The computer-implemented method of claim 8, wherein the user interface is further configured to receive one or more user inputs defining one or more parameters to be applied to at least one of the two or more features.

12. The computer-implemented method of claim 11, wherein the one or more parameters include at least one of: smoothing, averaging, downsampling, or removing outliers.

13. The computer-implemented method of claim 8, wherein the first model is at least one of: a machine learning model, a linear model, an elastic net model, or a support vector machine model.

14. The computer-implemented method of claim 8, wherein the user interface is further configured to receive one or more user inputs defining one or more weights to be applied to at least a portion of at least one of the two or more features.

* * * * *